United States Patent
Young et al.

(10) Patent No.: US 9,828,039 B2
(45) Date of Patent: *Nov. 28, 2017

(54) IMPACT PROTECTION STRUCTURES FOR VEHICLES AND VEHICLES INCORPORATING THE SAME

(71) Applicants: TOYOTA JIDOSHA KABUSHIKI KAISHA, Aichi-Ken (JP); Tesla Motors, Inc., Palo Alto, CA (US)

(72) Inventors: Jonathan Richard Young, Saline, MI (US); Donald James Robert Parr, San Francisco, CA (US); Ernest Matthew Villanueva, San Francisco, CA (US); Nathan Nelson, San Francisco, CA (US); Paul Dewitt Frey, Portola Valley, CA (US)

(73) Assignees: Toyota Jidosha Kabushiki Kaisha, Aichi-Ken (JP); Tesla Motors, Inc., Palo Alto, CA (US)

(*) Notice: Subject to any disclaimer, the term of this patent is extended or adjusted under 35 U.S.C. 154(b) by 18 days.

This patent is subject to a terminal disclaimer.

(21) Appl. No.: 14/458,843

(22) Filed: Aug. 13, 2014

(65) Prior Publication Data
US 2014/0346813 A1    Nov. 27, 2014

Related U.S. Application Data

(62) Division of application No. 13/446,781, filed on Apr. 13, 2012, now Pat. No. 8,833,839.

(51) Int. Cl.
*B62D 25/20*    (2006.01)
*B60R 16/04*    (2006.01)
(Continued)

(52) U.S. Cl.
CPC .............. *B62D 25/20* (2013.01); *B60R 16/04* (2013.01); *B62D 21/157* (2013.01);
(Continued)

(58) Field of Classification Search
CPC .. B62D 25/20; B62D 25/2036; B62D 25/025; B62D 25/02; B62D 21/157; B60R 16/04
USPC ......... 296/187.04, 187.12, 187.08, 209, 37.1
See application file for complete search history.

(56) References Cited

U.S. PATENT DOCUMENTS

| | | | |
|---|---|---|---|
| 4,493,506 A | 1/1985 | Alexander | |
| 4,911,495 A | 3/1990 | Haga et al. | |
| (Continued) | | | |

FOREIGN PATENT DOCUMENTS

| | | |
|---|---|---|
| JP | 2889162 | 5/1999 |
| JP | 7179185 | 4/2009 |

OTHER PUBLICATIONS

U.S. Patent and Trademark Office, Office Action dated May 13, 2013 in U.S. Appl. No. 13/446,810.

*Primary Examiner* — Joseph D Pape
*Assistant Examiner* — Dana Ivey
(74) *Attorney, Agent, or Firm* — Dinsmore & Shohl LLP

(57) ABSTRACT

Impact protection structures for vehicles are described. An impact protection structure includes a support structure of the vehicle, an interior rail coupled to the support structure, and an exterior rail coupled to the interior rail. The exterior rail has an inboard boundary wall positioned between an upper mounting region and a lower mounting region. The upper and the lower exterior mounting region of the exterior rail are coupled to an upper and a lower mounting region of the interior rail. At least a portion of the inboard boundary wall is spaced apart from an outboard wall of the interior rail such that when the exterior rail is impacted by a blunt-object barrier, the inboard boundary wall of the exterior rail deforms, thereby damping energy of the impact at the exterior rail and arresting crack propagation between the exterior rail and the interior rail.

20 Claims, 16 Drawing Sheets

(51) Int. Cl.
*B62D 21/15* (2006.01)
*B62D 25/02* (2006.01)

(52) U.S. Cl.
CPC ....... *B62D 25/025* (2013.01); *B62D 25/2036* (2013.01); *B62D 25/02* (2013.01)

(56) References Cited

U.S. PATENT DOCUMENTS

| | | |
|---|---|---|
| 5,464,266 A | 11/1995 | Guertler |
| 5,542,738 A | 8/1996 | Walker et al. |
| 5,573,298 A | 11/1996 | Walker et al. |
| 5,765,906 A | 6/1998 | Iwatsuki et al. |
| 5,822,927 A | 10/1998 | Hellenkamp et al. |
| 5,924,765 A | 7/1999 | Lee |
| 6,325,451 B1 | 12/2001 | Sikorski |
| 6,357,819 B1 | 3/2002 | Yoshino |
| 6,357,822 B1 | 3/2002 | Panoz et al. |
| 6,386,625 B1 | 5/2002 | Dukat et al. |
| 6,428,085 B1 * | 8/2002 | Miyasaka ............ B60N 2/0715 296/187.12 |
| 7,407,219 B2 | 8/2008 | Glasgow et al. |
| 7,445,269 B2 * | 11/2008 | Yustick ................ B62D 21/157 296/187.01 |
| 7,537,273 B2 | 5/2009 | Lassl et al. |
| 7,617,916 B2 | 11/2009 | Heatherington et al. |
| 7,695,056 B2 | 4/2010 | Hanson, Jr. et al. |
| 7,874,600 B2 | 1/2011 | Hashimura |
| 7,992,920 B2 | 8/2011 | Deng et al. |
| 8,127,506 B2 | 3/2012 | Schneider et al. |
| 2011/0169302 A1 | 7/2011 | Deng et al. |

\* cited by examiner

IMPACT PROTECTION STRUCTURES FOR VEHICLES AND VEHICLES INCORPORATING THE SAME

CROSS-REFERENCE TO RELATED APPLICATIONS

This application is a divisional application of U.S. Non-Provisional Application Ser. No. 13/446,781 filed Apr. 13, 2012 entitled "Impact Protection Structures for Vehicles and Vehicles Incorporating the Same."

TECHNICAL FIELD

The present specification generally relates to impact protection structures for vehicles and, more specifically, to side impact protection structures that include an interior rail and an exterior rail.

BACKGROUND

Passenger vehicles must be capable of withstanding the high forces experienced during collisions. In the United States, vehicles must comply with the Federal Motor Vehicle Safety Standards (FMVSS) and Insurance Institute for Highway Safety protocols, which describe, among other specifications, crashworthiness and vehicle integrity standards.

In addition to the standards applicable to conventional, gasoline or diesel-fueled vehicles, in electric and hybrid-electric vehicles, it is important to protect the integrity of the battery packs that are used to power the vehicle. Accordingly, a need exists for alternative impact protection structures for vehicles and vehicles incorporating the same.

SUMMARY

In one embodiment, an impact protection structure for a vehicle impacting a blunt-object barrier includes a support structure of the vehicle, an interior rail having an upper interior mounting region and a lower interior mounting region, where the interior rail is coupled to the support structure, and an exterior rail having an inboard boundary wall positioned between an upper exterior mounting region and a lower exterior mounting region. The upper exterior mounting region and the lower exterior mounting region of the exterior rail are coupled to the upper and lower interior mounting regions of the interior rail. At least a portion of the inboard boundary wall is spaced apart from an outboard wall of the interior rail such that when the exterior rail is impacted by a blunt-object barrier, the inboard boundary wall of the exterior rail deforms towards the outboard wall of the interior rail thereby damping energy of the impact at the exterior rail and arresting crack propagation between the exterior rail and the interior rail.

In another embodiment, an impact protection structure for a vehicle impacting a blunt-object barrier includes a support structure of the vehicle, an interior rail coupled to the support structure, and an exterior rail coupled to the interior rail at a plurality of securement positions along a length of the interior rail. Each of the plurality of securement positions are spaced apart from an adjacent securement position. The interior rail and the support structure form an interior connection along the length of the interior rail. The exterior rail and the interior rail form an exterior connection along the length of the interior rail. A strength of the interior connection is greater than a strength of the exterior connection such that when the exterior rail is impacted by a blunt-object barrier, the exterior rail deforms at least partially around the blunt-object barrier and separates the exterior connection between the exterior rail and the interior rail while the interior connection remains intact, such that tensile load induced to the interior connection is mitigated.

In yet another embodiment, an impact protection structure for a vehicle impacting a blunt-object barrier includes a support structure of the vehicle, an interior rail coupled to the support structure, where the interior rail comprises a predetermined interior buckling load limit, and an exterior rail coupled to the interior rail, where the exterior rail comprises a predetermined exterior buckling load limit. The exterior buckling load limit of the exterior rail is greater than the interior buckling load limit of the interior rail such that when the exterior rail is impacted by a blunt-object barrier, at least a portion of the interior rail buckles before the exterior rail.

In yet another embodiment, an impact protection structure for a vehicle impacting a blunt-object barrier includes a support structure of the vehicle, an interior rail coupled to the support structure, where the interior rail comprises a predetermined interior buckling load limit, and an exterior rail coupled to the interior rail, where the exterior rail comprises a predetermined exterior buckling load limit. The exterior buckling load limit of the exterior rail is less than the interior buckling load limit of the interior rail such that when the exterior rail is impacted by a blunt-object barrier, at least a portion of the exterior rail buckles before the interior rail.

In still another embodiment, an impact protection structure for a vehicle impacting a blunt-object barrier includes a support structure of the vehicle, an interior rail for coupling to the support structure, and an exterior rail coupled to the interior rail. The exterior rail includes a plurality of enclosed exterior lumens, wherein each of the exterior lumens has an associated buckling load limit, and a first exterior lumen has a lower buckling resistance to a load applied to the exterior rail at a contact surface than a second exterior lumen located inboard of the first exterior lumen.

In a further embodiment, an impact protection structure for a vehicle impacting a blunt-object barrier includes a support structure of the vehicle, an interior rail for coupling to the support structure, and an exterior rail coupled to the interior rail. The exterior rail includes a contact surface positioned at a furthest distal position from the interior rail, where the exterior rail comprises a shear center, and the contact surface is positioned at a vertical offset from the shear center.

In yet another embodiment, a vehicle includes a support structure and an impact protection structure coupled to the support structure. The impact protection structure includes an interior rail coupled to the support structure and an exterior rail coupled to the interior rail. The exterior rail includes a plurality of exterior lumens. The exterior rail is coupled to the interior rail at a plurality of securement positions along a length of the interior rail.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
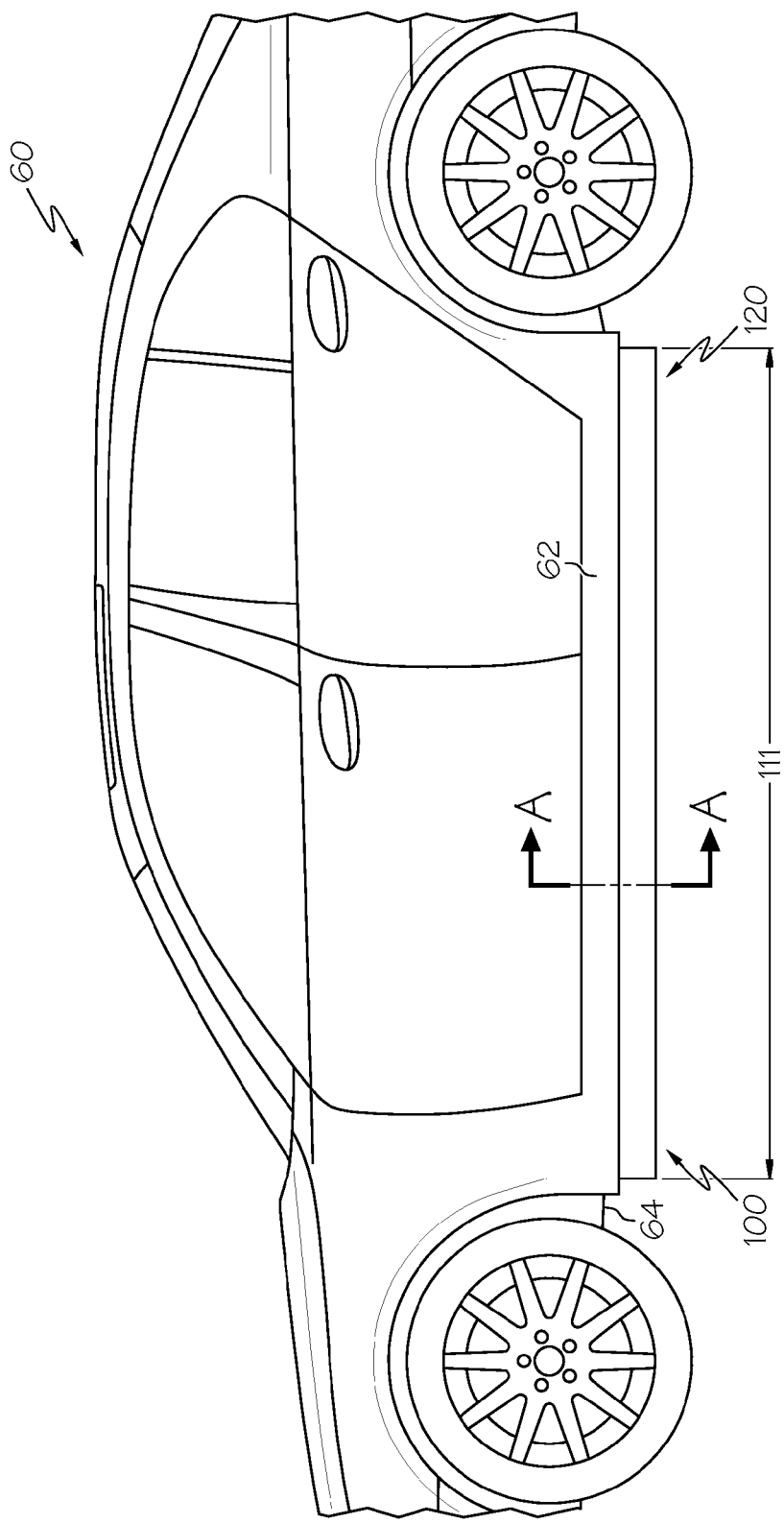
FIG. 1 schematically depicts a partial side view of a vehicle having an impact protection structure positioned along the side of the vehicle according to one or more embodiments shown or described herein.
Figure 2:
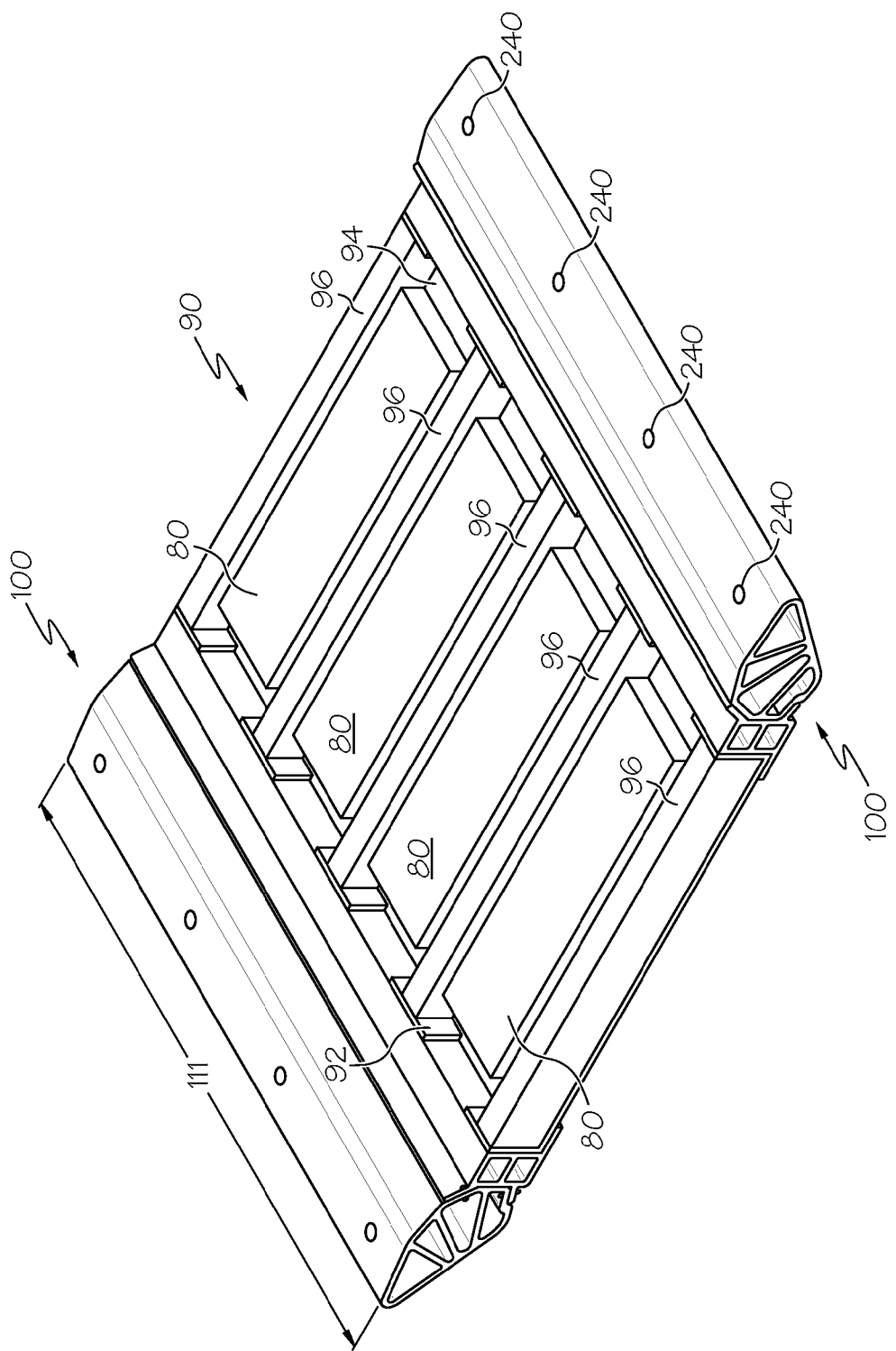
FIG. 2 schematically depicts a perspective view of a battery support tray and impact protection structures for a vehicle according to one or more embodiments shown or described herein.

FIGS. 1 and 2 generally depict a vehicle with impact protection structures coupled to a battery support tray that is positioned along the bottom of the vehicle. The impact protection structures include an interior rail coupled to the battery support tray and an exterior rail coupled to the interior rail. The exterior rail includes a plurality of exterior lumens, which have associated buckling load limits. In some embodiments, the buckling load limits increase in an inboard direction of the vehicle. When impacted in a collision, the exterior lumens buckle, dissipating the energy associated with the collision. While the impact protection structures are depicted as positioned along the sides of the vehicle, it should be understood that the impact protection structures may be positioned in other orientations, including forward or aft-facing positions of the vehicle. Further, it should be understood that the impact protection structures may alternatively be coupled directly to the vehicle frame or the unibody. The impact protection structures and vehicles incorporating the same will be described in more detail herein with specific reference to the appended drawings.

In describing embodiments of the impact protection structures and the vehicles, the terms "inboard" and "outboard" will be used to describe the relative positioning of various components. The terms "inboard" or "inboard direction," as used herein, refer to a side or surface of a layer or structure closest to the centerline a vehicle while the terms "outboard" or "outboard direction" refer to a side or surface of a layer or structure furthest from the interior of the passenger compartment of the vehicle.

Referring to FIGS. 1 and 2, one embodiment of impact protection structures 100 coupled to a support structure of the vehicle 60 is schematically depicted. As used herein, "support structure" may refer to the battery support tray 90 or a vehicle frame or unibody 64 of the vehicle 60. The impact protection structures 100 include interior rails 110 coupled to the battery support tray 90 and exterior rails 120 coupled to the interior rails 110. As will be discussed in detail below, the exterior rails 120 are coupled to the interior rails 110 at a plurality of positions along the interior rail length 111. In the embodiment depicted in FIGS. 1 and 2, the impact protection structures 100 are coupled to the battery support tray 90, at least one of which is coupled to the vehicle frame or unibody 64 of the vehicle 60. In the embodiment depicted in FIG. 2, fasteners (not shown) are inserted through a plurality of attachment positions 240 through the impact protection structures 100. The fasteners secure the impact protection structures 100 and the battery support tray 90 to the vehicle frame or unibody 64 of the vehicle 60. In other embodiments, the battery support tray 90 may be secured directly to the vehicle frame or unibody 64 without attachment of the impact protection structures 110 to the vehicle frame or unibody 64. It should be understood that the impact protection structures 100 may be attached to other support structures of the vehicle 60. For example, the impact protection structures 100 may be coupled directly to the vehicle frame or unibody 64 of the vehicle 60. Thus, impact protection structures 100 according to the present disclosure may be included with conventional, gasoline or diesel-fueled vehicles 60 that do not include a battery support tray 90.

The battery support tray 90 includes a plurality of cross-support members 96 that are coupled to a tray floor 94. The cross-support members 96 may be coupled to end plates 92 positioned at the ends of the cross-support members 96 for attachment to the impact protection structures 100. In some embodiments, the end plates 92 and the cross-support members may be integrated components formed using a casting or welding process. The cross-support members 96 may be constructed to satisfy the requirements of stiffness and strength to provide support to the impact protection structure 100 during an impact event, as described below. In one embodiment, the cross-support members 96 include a plurality of components that are attached to each other. The cross-support members 96 may include hollow lumens arranged through their thickness. The cross-support members 96 may be made from a variety of materials including, without limitation, extruded aluminum alloy channels and steel channels.

As depicted in FIG. 1, the impact protection structure 100 is coupled to the underside of the vehicle 60. A portion of the exterior rail 120 of the impact protection structure 100 may be visible along the side of the vehicle 60. In the embodiment depicted in FIG. 1, a portion of the exterior rail 120 is visible below the side sill 62 of the vehicle 60. However, in alternate embodiments, the exterior rail 120 may be completely visible or completely shielded from view by trim or body components of the vehicle 60.

It should be understood that the battery support tray 90 may be modular and interchangeable for use in a variety of vehicles 60. The interchangeability of the battery support tray 90 across a variety of vehicles 60 may allow the battery support tray 90 to be used across multiple vehicle lines, which may decrease costs associated with development and/or production of the vehicle 60. The impact protection structure 100, including the interior rail 110 and the exterior rail 120, may be designed to suit the particular vehicle 60 layout requirements, for example, by accommodating the packaging constraints of the particular vehicle 60 and providing the desired side impact protection, while continuing to use the interchangeable battery support tray 90.

Figure 3:
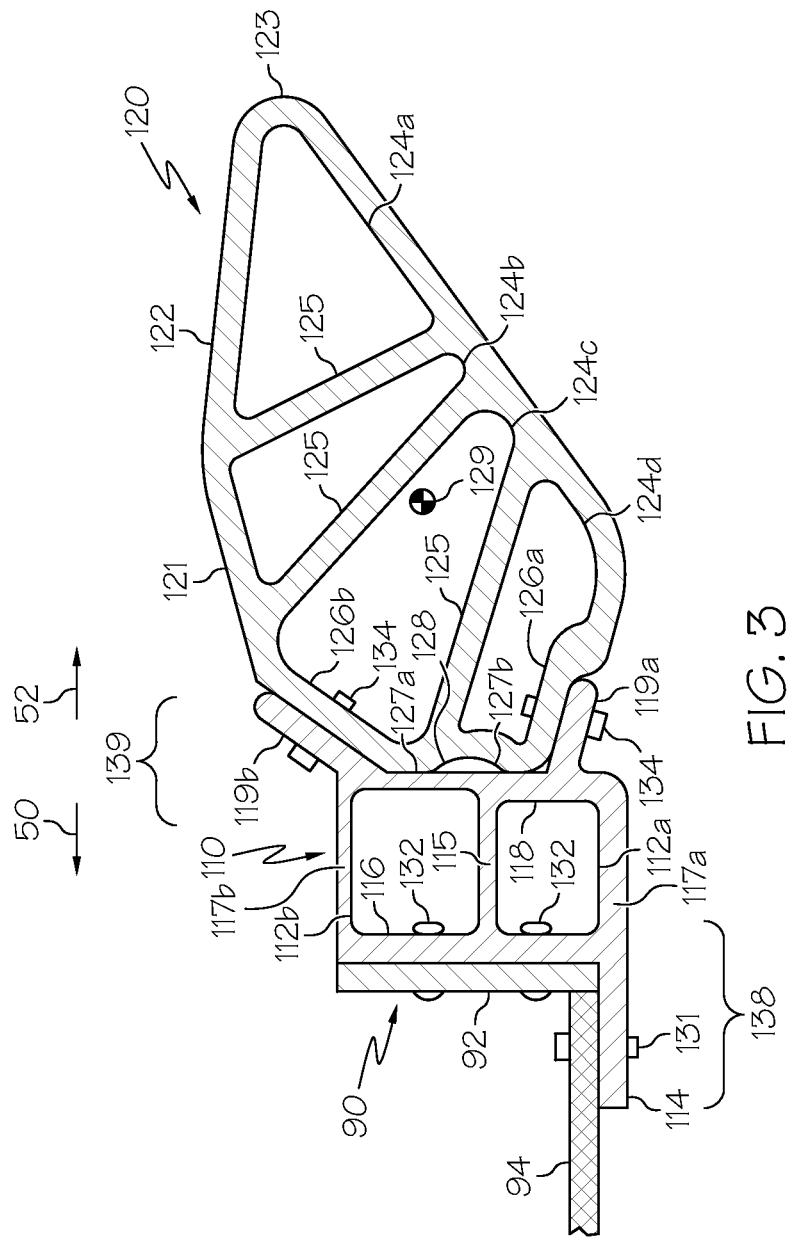
FIG. 3 schematically depicts a front sectional view of an impact protection structure for a vehicle shown along line A-A of FIG. 1 according to one or more embodiments shown or described herein.

Referring now to FIG. 3, a cross-sectional view of one embodiment of an impact protection structure 100 is schematically depicted. The impact protection structure 100 includes an interior rail 110 and an exterior rail 120 coupled to the interior rail 110. The embodiments of the interior rail 110 and the exterior rail 120 depicted in FIG. 3 are extruded such that the interior rail 110 and the exterior rail 120 have generally continuous cross sections along their lengths. The interior rail 110 and the exterior rail 120 may be made from a variety of materials including, but not limited to, steel or alloys thereof, aluminum or alloys thereof, or high-strength polymers which may include composite reinforcements.

The interior rail 110 includes at least one interior lumen 112, an inboard wall 116, an outboard wall 118, and lower and upper intermediate walls 117a, 117b that define the at least one interior lumen 112. The interior rail 110 also includes at least one support structure mounting region 114 extending inboard from the interior lumen 112, and at least one interior mounting region (lower and upper interior mounting regions 119a, 119b as shown in FIG. 3) extending outboard from the interior lumen 112. The at least one support structure mounting region 114 is coupled to the battery support tray 90, and the lower and upper interior mounting regions 119a, 119b are coupled to the exterior rail 120 of the impact protection structure 100. In the embodiment depicted in FIG. 3, the interior rail 110 includes a first interior lumen 112a and a second interior lumen 112b separated by a interior septum 115, and a lower interior mounting region 119a and an upper interior mounting region 119b. It should be understood that the phrase "mounting region," as used herein, refers to a location of a component that is used to attach another component thereto. In some embodiments, the mounting region may be a flange that extends from one component to ease attachment to another component. In other embodiments, the mounting region may be an integrated face of a component such as a planar area. It should be understood that the location of flanges and faces may be located at different positions without departing from the scope of the disclosure.

In some embodiments, the inboard wall 116, the outboard wall 118, the lower and upper intermediate walls 117a, 117b, and the interior septum 115, if any, may have a substantially uniform wall thickness. In other embodiments, the wall thicknesses of the inboard wall 116, the outboard wall 118, the lower and upper intermediate walls 117a, 117b, and the interior septum 115, if any, may be varied to provide an interior rail 110 having the desired strength properties. In the embodiment depicted in FIG. 3, the upper intermediate wall 117b and the interior septum 115, along with a portion of the outboard wall 118 proximate to the second interior lumen 112b have thinner wall thicknesses as compared to the wall thicknesses of the inboard wall 116 and the lower intermediate wall 117a. By decreasing the wall thicknesses in such locations, the interior rail 110 exhibits a preferential buckling shape that tends to collapse when the exterior rail 120 is impacted by a blunt-object barrier 70, as will be discussed below. It should be noted that increasing the wall thicknesses of the interior rail 110 and/or the exterior rail 120 may increase the energy dissipative features of the interior rail 110 and/or the exterior rail. However, increasing the wall thicknesses of these components increases the weight of the component. As used herein, "blunt-object barrier" 70 refers to a pole-like barrier used in testing according to FMVSS 201 and 214. Such a pole-like barrier simulates vehicle impact with telephone poles, trees, concrete posts, and the like. However, impact protection structures 100 according to the present disclosure may be utilized to resist impact by a variety of blunt-objects including real-world impacts.

The interior rail 110 is coupled to the battery support tray 90 with a plurality of mechanical fasteners to form an interior connection 138. As depicted in FIG. 3, the support structure mounting region 114 of the interior rail 110 is coupled to the tray floor 94 by a plurality of mechanical fasteners 131. The mechanical fasteners 131 may be, but are not limited to, pop rivets, solid core rivets, or self piercing rivets made from a variety of materials including, but not limited to, aluminum, steel, or alloys thereof. The mechanical fasteners 131 may also be bolts and nuts or screws. The support structure mounting region 114 of the interior rail 110 may also be secured to the tray floor 94 by a structural adhesive, for example an epoxy or an acrylic resin. Alternatively, or in addition, the support structure mounting region 114 of the interior rail 110 may be secured to the tray floor 94 through a joining process, for example welding, including resistance spot welding, friction stir welding, gas tungsten arc welding, gas metal arc welding, or brazing.

The inboard wall 116 of the interior rail 110 is coupled to the end plates 92 of the battery support tray 90 that are attached to the cross-support members 96. As depicted in FIG. 3, the inboard wall 116 of the interior rail 110 may be secured to the end plates 92 by a plurality of mechanical fasteners 132 including, but not limited to, bolts and nuts, screws, and rivets. The inboard wall 116 may also be secured to the end plates 92 with a structural adhesive. Alternatively, or in addition, the inboard wall 116 of the interior rail 110 may be secured to the end plates 92 through a joining process, for example welding, including resistance spot welding, friction stir welding, gas tungsten arc welding, gas metal arc welding, or brazing. The structural connections between the battery support tray 90 and the interior rail 110 define an interior connection strength, which is the load required to separate the interior rail 110 from the battery support tray 90. The interior connection strength may be affected, for example, by the number, size, type, and strength of mechanical fasteners 131, 132, as well as the thickness and strength of the tray floor 94, the support structure mounting region 114, and the inboard wall 116 of the interior rail 110. While the mechanical fasteners 131, 132 are depicted linearly arranged along the impact protection structure 100, it should be understood that any arrangement of mechanical fasteners 131, 132, including multiple rows of mechanical fasteners 131, 132, may be used.

The exterior rail 120 includes a plurality of exterior lumens 124, a plurality of septa 125 separating the exterior lumens 124 from one another, and at least one exterior mounting region 126. The exterior rail 120 includes a contact surface 123, which is the outboard most portion of the exterior rail 120 that is positioned at the furthest distal position from the interior rail 110. The exterior rail 120 also includes an inboard rocker surface 121 and an outboard rocker surface 122. The inboard and the outboard rocker surfaces 121, 122 are portions of the exterior rail 120 that may fracture and/or buckle onto themselves and/or onto one another when the contact surface 123 contacts a blunt-object barrier 70, as will be discussed below. The exterior rail 120 further includes a shear center 129, which is defined as a position where shear force can be applied to the exterior rail 120 without inducing torsion. The shear center 129 is dependent on the cross-sectional geometry of the exterior rail 120. The contact surface 123 and the inboard and outboard rocker surfaces 121, 122 may all be positioned vertically above or below the exterior rail shear center 129. In the embodiment depicted in FIG. 3, the contact surface 123 and the inboard and the outboard rocker surfaces 121, 122 are positioned a vertical distance above the exterior rail shear center 129. Thus, contact with a blunt-object barrier 70 at the contact surface 123 will tend to induce a torsion (i.e., a moment load) that tends to collapse the exterior rail 120.

The exterior rail 120 depicted in FIG. 3 includes lower and upper exterior mounting regions 126a, 126b that are spaced below and above, respectively, an inboard boundary wall 128 of the exterior rail 120. The inboard boundary wall 128 may include a planar portion 127a and a contoured portion 127b. The inclusion of the planar portion 127a and the contoured portion 127b allows a portion of the inboard boundary wall 128 to contact the outboard wall 118 of the interior rail 110, while allowing a portion of the inboard boundary wall 128 to be spaced apart from the outboard wall 118 of the interior rail 110. By spacing a portion of the inboard boundary wall 128 away from the outboard wall 118 of the interior rail 110, energy due to contact with a blunt-object barrier 70 may be dissipated by deforming the exterior rail 120 without transferring the energy to the interior rail 110. This configuration may damp impact energy due to contact with the blunt-object barrier 70 and mitigate or arrest crack propagation from the exterior rail 120 to the interior rail 110 when a blunt-object barrier 70 collision with the impact protection structure 100 occurs. The spacing between the inboard boundary wall 128 of the exterior rail 120 and the outboard wall 118 of the interior wall may damp an impulse that initiates crack growth.

The exterior rail 120 is coupled to the interior rail 110 to form an exterior connection 139 by connecting the exterior mounting regions 126 to the interior mounting regions 119 of the interior rail 110. With the exterior rail 120 so positioned relative to the interior rail 110, the exterior rail 120 and the interior rail 110 may be coupled to one another by a plurality of mechanical fasteners 134 including, but not limited to, bolts and nuts, screws, and rivets. The exterior rail 120 may also be secured to the interior rail 110 by a structural adhesive. Alternatively, or in addition, the lower and the upper interior mounting regions 119a, 119b of the interior rail 110 may be secured to the lower and the upper exterior mounting regions 126a, 126b of the exterior rail 120 through a joining process, for example welding, including resistance spot welding, friction stir welding, gas tungsten arc welding, gas metal arc welding, or brazing. In some embodiments, interstitial positions between the points of connection of the interior rail 110 and the exterior rail 120 may abut one another or may be spaced apart from one another, but are not joined to one another, leaving the interstitial positions between the points of connection between the interior rail 110 and the exterior rail 120 "detached" from one another. By maintaining these positions of detachment between the interior rail 110 and the exterior rail 120, any crack growth in the exterior rail 120 caused by a blunt-object impact may be arrested, and prevented from propagating through the interior rail 110, as discussed in greater detail below. In the case of welded joints, the exterior connection 139 may be continuous along the length 111 of the interior rail 110.

The structural connections between the interior rail 110 and the exterior rail 120 define an exterior connection strength, which is the load required to separate the exterior rail 120 from the interior rail 110. The exterior connection strength may be affected, for example, by the number, size, type, and strength of mechanical fasteners 134, as well as the thickness and strength of the interior mounting regions 119 of the interior rail 110 and the lower and the upper exterior mounting regions 126a, 126b of the exterior rail 120. The exterior connection strength between the interior rail 110 and the exterior rail 120 may be less than the interior connection strength between the battery support tray 90 and the interior rail 110. In general, locations of the interior rail 110 and exterior rail 120 proximate to the blunt-object barrier 70 are subject to compressive loads due to a collision. However, because of the structure of the battery support tray 90 and the spacing between cross-support members 96, a collision with blunt-object barrier 70 will tend to induce a tensile load into the outer rail 120 at locations distal from the cross-support members 96 (see FIG. 2). Such tensile loads may be induced in battery support trays 90 having at least three cross-support members 96. Because the exterior connection strength is less than the interior connection strength, in the event a tensile load is induced onto the exterior rail 120, the exterior connection 139 may be compromised and fail at a lower load than the interior connection 138 as discussed in greater detail below. With the exterior connection 139 compromised, the exterior rail 120 may absorb additional energy due to a blunt-object impact without transferring that energy to the interior connection 138, for example by fracturing, elastically deforming, and/or plastically deforming the exterior rail 120 or portions of the exterior rail 120. By not transferring the energy to the interior connection 138, the structural integrity of the battery support tray 90 is maintained. Thus, the difference between the interior connection strength and the exterior connection strength prevent tensile load from being transferred to the battery support tray 90 at positions proximate to the ends 109 of the interior rail 110 by separating the exterior connection 139 between the interior rail 110 and the exterior rail 120.

Figure 4:
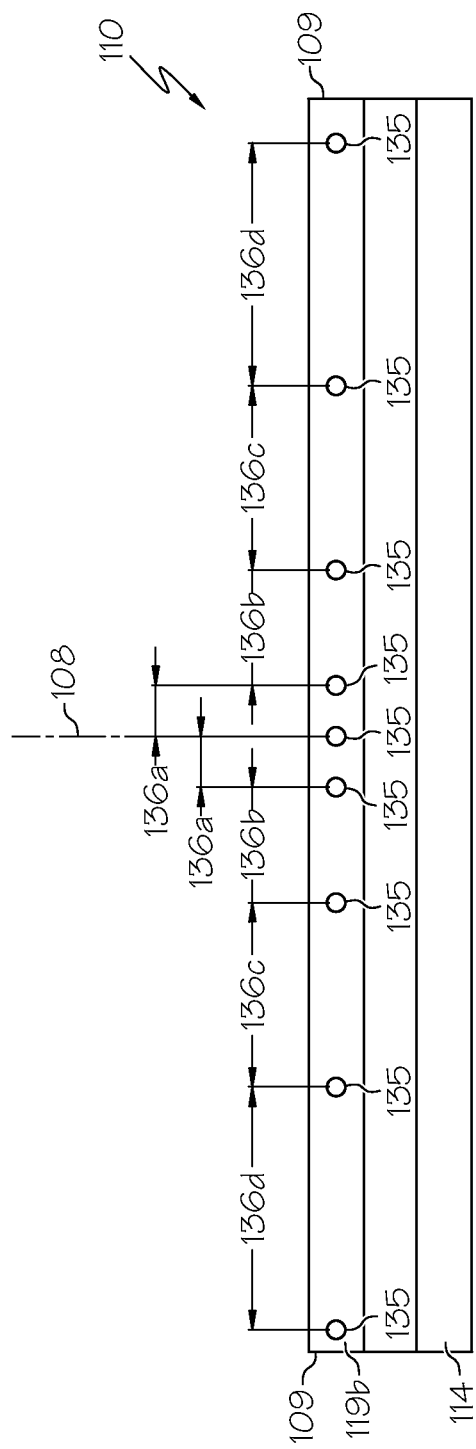
FIG. 4 schematically depicts a top view of an impact protection structure for a vehicle according to one or more embodiments shown or described herein.
Figure 5:
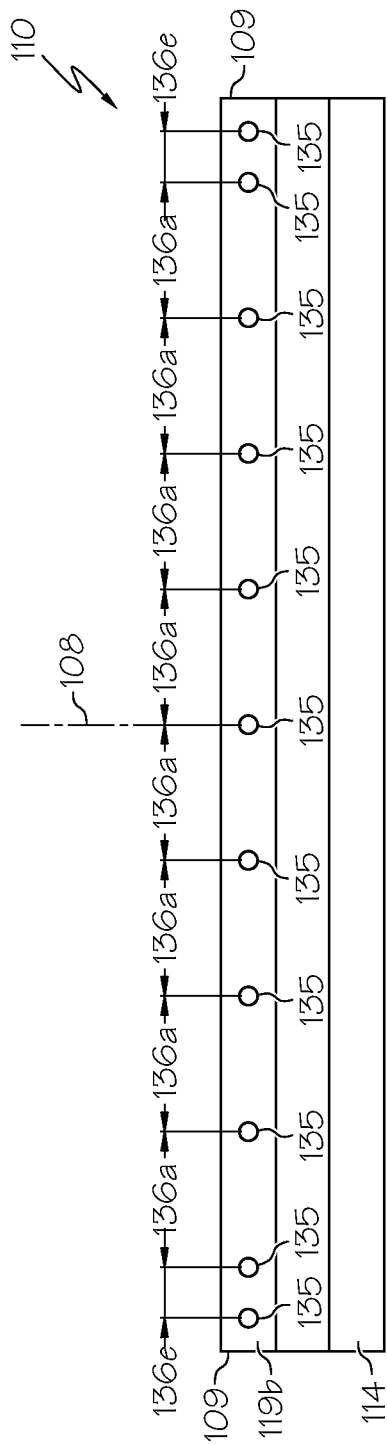
FIG. 5 schematically depicts a top view of an impact protection structure for a vehicle according to one or more embodiments shown or described herein.

Referring now to FIGS. 4 and 5, the interior rail 110 may include a plurality of securement positions 135 that correspond to the locations of the mechanical fasteners 134 joining the lower and the upper interior mounting regions 119a, 119b of the interior rail 110 to the lower and the upper exterior mounting regions 126a, 126b of the exterior rail 120 (see FIG. 3). The securement positions 135, and the corresponding mechanical fastener 134 positions, may be spaced apart from one other in a pre-determined pattern. In the embodiment depicted in FIG. 4, the spacing 136a between securement positions 135 is smallest near the center 108 of the interior rail 110. The spacing distance between securement positions 135 increases away from the center 108 of the interior rail 110 towards the ends 109 of the interior rail 110 (i.e., spacing 136b is less than spacing 136d). In the embodiment depicted in FIG. 5, the spacing 136a between securement positions 135 is approximately uniform at interior positions of the interior rail 110 (i.e., between the ends 109 of the interior rail 110) but decrease at positions proximate to the ends 109 of the interior rail 110 (i.e., spacing 136e is less than spacing 136a). The increased density of securement positions 135 (and corresponding mechanical fasteners 134) provides additional support near the ends 109 of the interior rail 110. The pattern of securement positions 135 in the interior rail 110 and the corresponding location of the mechanical fasteners 134 affects the exterior connection strength at local positions along the interior rail length 111. As discussed in greater detail below, when the impact protection structure 100 undergoes a blunt-object impact, the exterior rail 120 tends to deform around the blunt-object barrier 70, inducing a tensile load into the interior connection 138 and the exterior connection 139. By varying the pattern of mechanical fasteners 134 that couple the exterior rail 120 to the interior rail 110, the local exterior connection strength at positions along the interior rail length 111 may be designed to accommodate the induced tensile load and the corresponding "lever-like" amplification of force caused by the distance between the position of blunt-object impact and the mechanical fasteners 134. The placement of the mechanical fasteners 134 can be determined based on simulation such that the mechanical fasteners 134 resist blunt-object impact occurring at a plurality of positions along the interior rail length 111.

Referring again to the embodiment depicted in FIG. 3, the exterior rail 120 includes four enclosed exterior lumens 124a, 124b, 124c, 124d from an outboard position to an inboard position. Each of the exterior lumens has an associated buckling load limit. The buckling load limit, as used herein, refers to the maximum load that can be applied to the exterior lumen 124a, 124b, 124c, 124d before the lumen loses stability and collapses in an inboard direction 50. The buckling load limit of any of the exterior lumens 124a, 124b, 124c, 124d may be simulated computationally, for example, using a non-linear finite element analysis program. The buckling load limit of the exterior lumens 124 may be approximated by calculating the bending strength each of the exterior lumens 124 when a force is applied to the contact surface 123 in an inboard direction 50. However, as the exterior lumens 124a, 124b, 124c, 124d and septa 125 move during application of loading, a calculation of bending strength of the undeformed exterior rail 120 may not accurately capture the dynamic phenomenon due to repositioning of the exterior lumens 124 and the septa 125. While the embodiment of the exterior rail 120 shown in FIG. 3 includes four exterior lumens 124a, 124b, 124c, 124d, it should be understood that, in other embodiments, the exterior rail 120 may be formed with more or fewer exterior lumens, and that the number of lumens may be selected to achieve a desired buckling performance upon experiencing a blunt-object impact. In addition, the exterior rail 120 may include a plurality of rail portions (not shown) that are affixed to one another to form a fabricated exterior rail 120. The rail portions form the exterior lumens 120 of the fabricated exterior rail 120. The shapes and thicknesses of the rail portions may be varied to produce a fabricated exterior rail 120 having the desired shape and impact protection capabilities.

In the embodiments described herein, the exterior rail 120 may be constructed such that the buckling load limit of the exterior lumens 124 progressively increases for exterior lumens 124 positioned in an inboard direction. For the embodiment depicted in FIG. 3, the first exterior lumen 124a has a buckling load limit less than the second exterior lumen 124b; the second exterior lumen 124b has a buckling load limit less than the third exterior lumen 124c; and the third exterior lumen 124c has a buckling load limit less than the fourth exterior lumen 124d. By incorporating exterior lumens 124 into the exterior rail 120 in this manner, the exterior lumens 124 preferentially collapse in the same progressive pattern when a force due to an impact with a blunt-object barrier 70 is applied to the exterior rail 120. The preferential collapse of the exterior lumens 124 may limit the magnitude of loads applied to the battery support tray 90, reducing the likelihood of damage to the battery packs 80 (as shown in FIG. 2).

Figure 6:
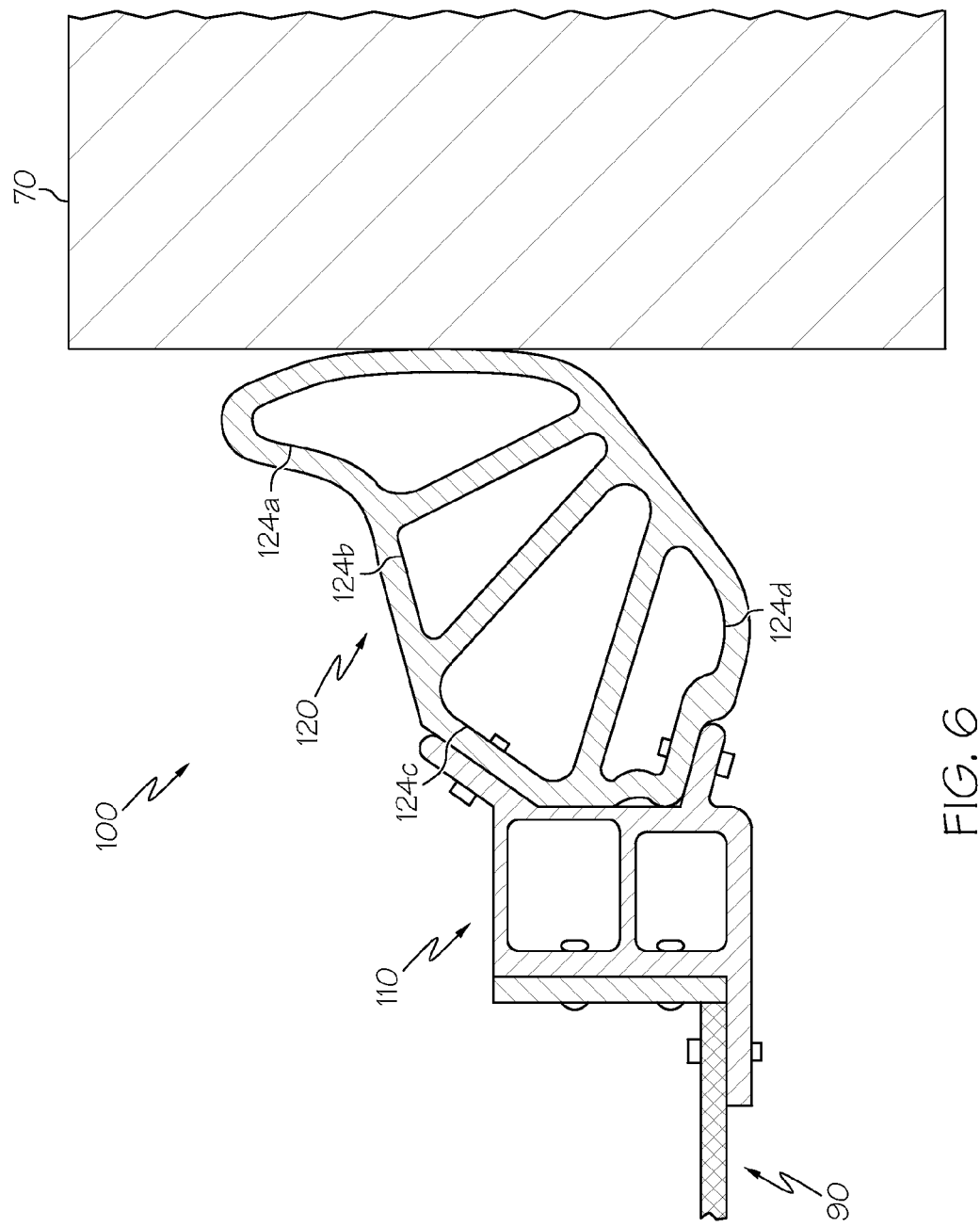
FIG. 6 schematically depicts the impact protection structure for a vehicle according to one or more embodiments shown or described herein undergoing a collision impact event.
Figure 7:
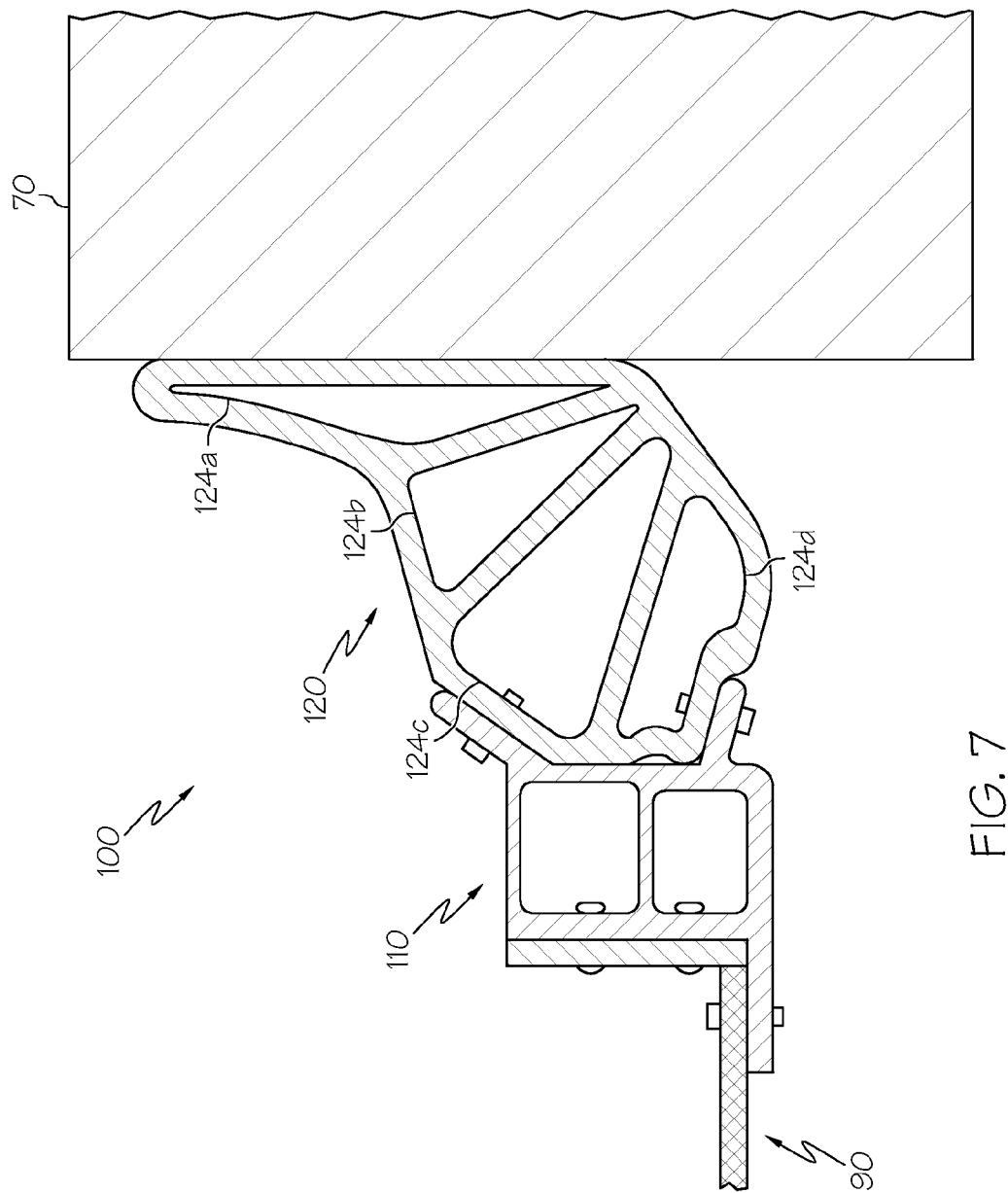
FIG. 7 schematically depicts the impact protection structure for a vehicle shown in FIG. 6 undergoing a collision impact event.
Figure 8:
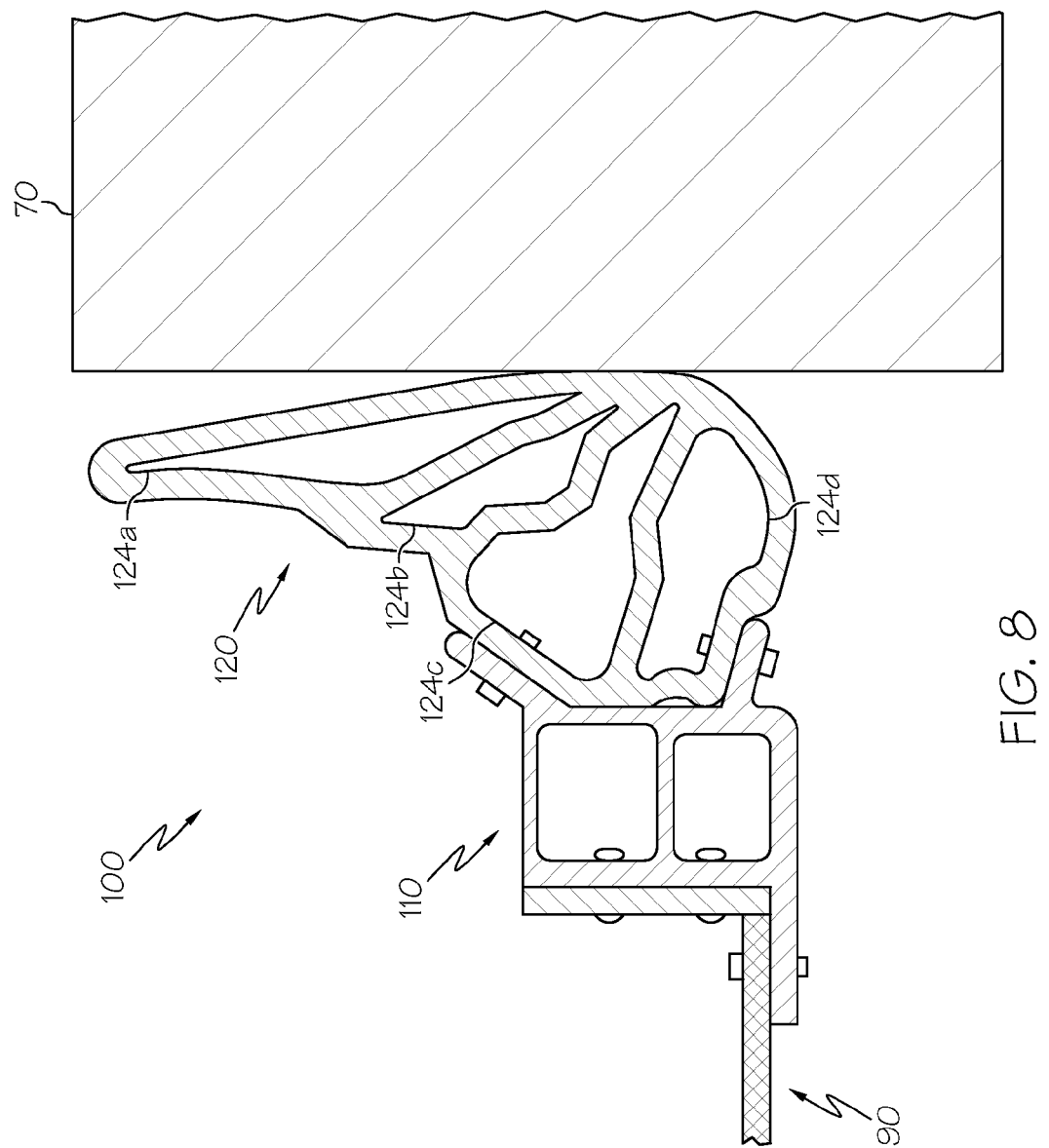
FIG. 8 schematically depicts the impact protection structure for a vehicle shown in FIG. 6 undergoing a collision impact event.

The embodiment of the impact protection structure 100 depicted in FIG. 3 is shown undergoing an impact event with a blunt-object barrier 70 in FIGS. 6-8. Referring now to FIG. 6, the exterior rail 120 contacts the blunt-object barrier 70. Because the first exterior lumen 124a has a buckling load limit less than the second, third, or fourth exterior lumens 124b, 124c, 124d, the initial application of force applied by the blunt-object barrier 70 initially deforms the first exterior lumen 124b. Thus, the first exterior lumen 124a deforms, while the second, third, and fourth interior lumens 124b, 124c, 124d remain largely or wholly undeformed (i.e., as shown in the undeformed state in FIG. 3).

Referring now to FIG. 7, the first exterior lumen 124a continues to deform until such time that the force applied by the blunt-object barrier 70 exceeds the buckling load limit of the second exterior lumen 124b. Once the buckling load limit of the second exterior lumen 124b has been exceeded, the second exterior lumen 124b collapses onto itself, while the third and fourth exterior lumen 124c, 124d remain largely or wholly undeformed (i.e., as shown in the undeformed state in FIG. 3). The first exterior lumen 124a continues to dissipate energy associated with the impact by the blunt-object barrier 70, however, the now-deformed shape of the first exterior lumen 124a reduces the amount of energy that the first exterior lumen 124a can continue to dissipate.

Referring now to FIG. 8, the first and second exterior lumens 124a, 124b continue to deform until such time that the force applied by the blunt-object barrier 70 exceeds the buckling load limit of the third and/or fourth exterior lumens 124c, 124d. Once the buckling load limit of the third exterior lumen 124c has been exceed, the third exterior lumen 124c and/or the fourth exterior lumen 124d collapse onto themselves. The first and second exterior lumens 124a, 124b continues to dissipate energy associated with the impact by the blunt-object barrier 70, however, the now-deformed shape of the first and second exterior lumens 124a, 124b reduce the amount of energy that the first and second exterior lumens 124a can continue to dissipate.

When a force due to an impact is applied to the exterior rail 120, the first exterior lumen 124a collapses, followed by the second exterior lumen 124b, the third exterior lumen 124c, and the fourth exterior lumen 124d. Referring again to FIGS. 6-8, the buckling load limit of the exterior lumens 124a, 124b, 124c, 124d of the exterior rail 120 are less than the buckling load limit of the interior rail 110. Thus, when a force due to an impact is applied to the impact protection structure 100, at least one of the exterior lumens 124a, 124b, 124c, 124d of the exterior rail 120 collapse before the interior rail 110.

Referring again to the embodiment depicted in FIG. 3, the contact surface 123 is positioned a vertical distance above the exterior rail shear center 129, as noted above. Depending on the packaging requirements of a particular vehicle 60 (i.e., the vertical position of the battery support tray 90, the vertical position of the side sills 62, and/or the center of gravity of the vehicle 60 as depicted in FIGS. 1 and 2), the contact surface 123 may be positioned a vertical distance above or below the exterior rail shear center 129. When a force is applied to the contact surface 123 which is offset vertically from the shear center 129, the exterior rail 120 will have a tendency to twist as the interior rail 110 and the exterior rail 120 deform, thereby applying a moment load to the mechanical fasteners 131 that couple the interior rail 110 to the tray floor 94 and the mechanical fasteners 132 that couple the interior rail 110 to the end plates 92. To limit the moment load that is transferred to the mechanical fasteners 131, 132 one or more of the interior rail 110 or the exterior rail 120 may be constructed to preferentially buckle, limiting the size of the moment arm between the contact surface 123 and the mechanical fasteners 131, 132.

Figure 9:
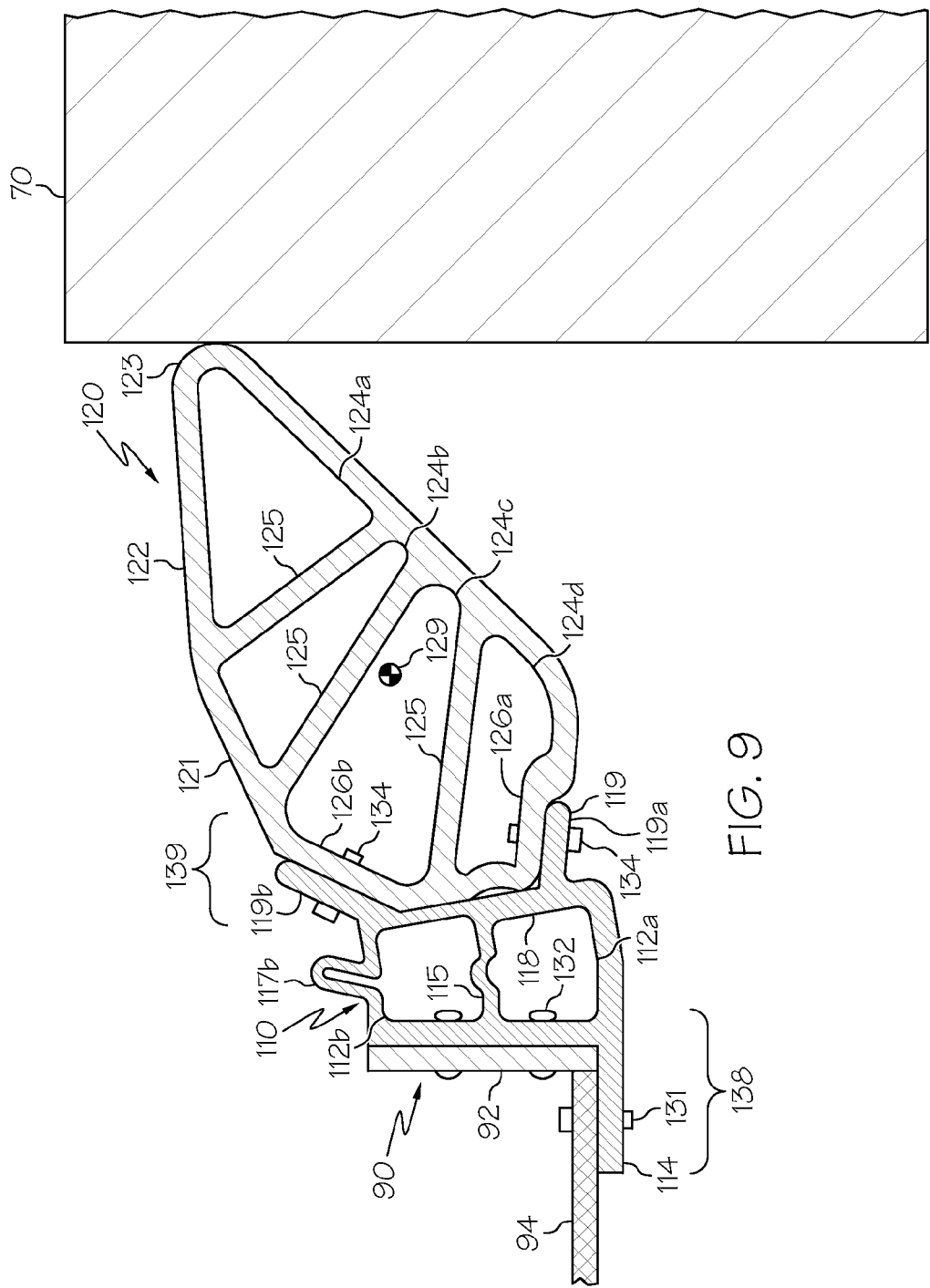
FIG. 9 schematically depicts a front sectional view of an impact protection structure for a vehicle shown along line A-A of FIG. 1 according to one or more embodiments shown and described herein.

Another embodiment of the impact protection structure 100 depicted in an undeformed state in FIG. 3 is reproduced in a deformed state in FIG. 9. In this embodiment, when the contact surface 123 contacts the blunt-object barrier 70, the exterior rail 120 applies a moment load to the mechanical fasteners 131, 132 through the interior rail 110. However, because the interior rail 110 is constructed with a thinned upper intermediate wall 117b and outboard wall 118, the moment load buckles the upper intermediate wall 117b and the interior septum 115, and collapses the outboard wall 118 towards the inboard wall 116 by bending the lower intermediate wall 117a. By preferentially buckling the interior rail 110, the vertical spacing between the contact surface 123 and the mechanical fasteners 131, 132 is limited, thereby limiting the length of the moment arm applying the moment load to the mechanical fasteners 131, 132 and mitigating damage to the end plates 92 of the battery support tray 90. Further, buckling of the interior rail 110 may also cause the battery support tray 90 to translate vertically away from the vehicle frame or unibody 64 (see FIG. 1), allowing other components of the vehicle 60 to absorb energy associated with the impact with the blunt-object barrier 70.

In some embodiments of the vehicle 60, the center of gravity of the vehicle 60 is spaced a vertical distance above the contact surface 123 of the exterior rail 120. When such a vehicle 60 is impacted by a blunt-object barrier 70, the momentum of the vehicle 60 applies an overturning moment to the vehicle 60 that tends to rotate the center of gravity of the vehicle 60 towards the blunt-object barrier. As depicted in FIG. 9, the overturning moment of the vehicle tends to rotate the impact protection structure 100 in a clockwise direction and apply an increased moment to the impact protection structure in a counter-clockwise direction. Therefore, this overturning moment may increase the loads applied to the upper surfaces of the impact protection structure 100 and may increase the likelihood of buckling of the preferential buckling shape of the interior rail 110. Further, the overturning moment may also increase shear load on the mechanical fasteners 131, 132.

Figure 10:
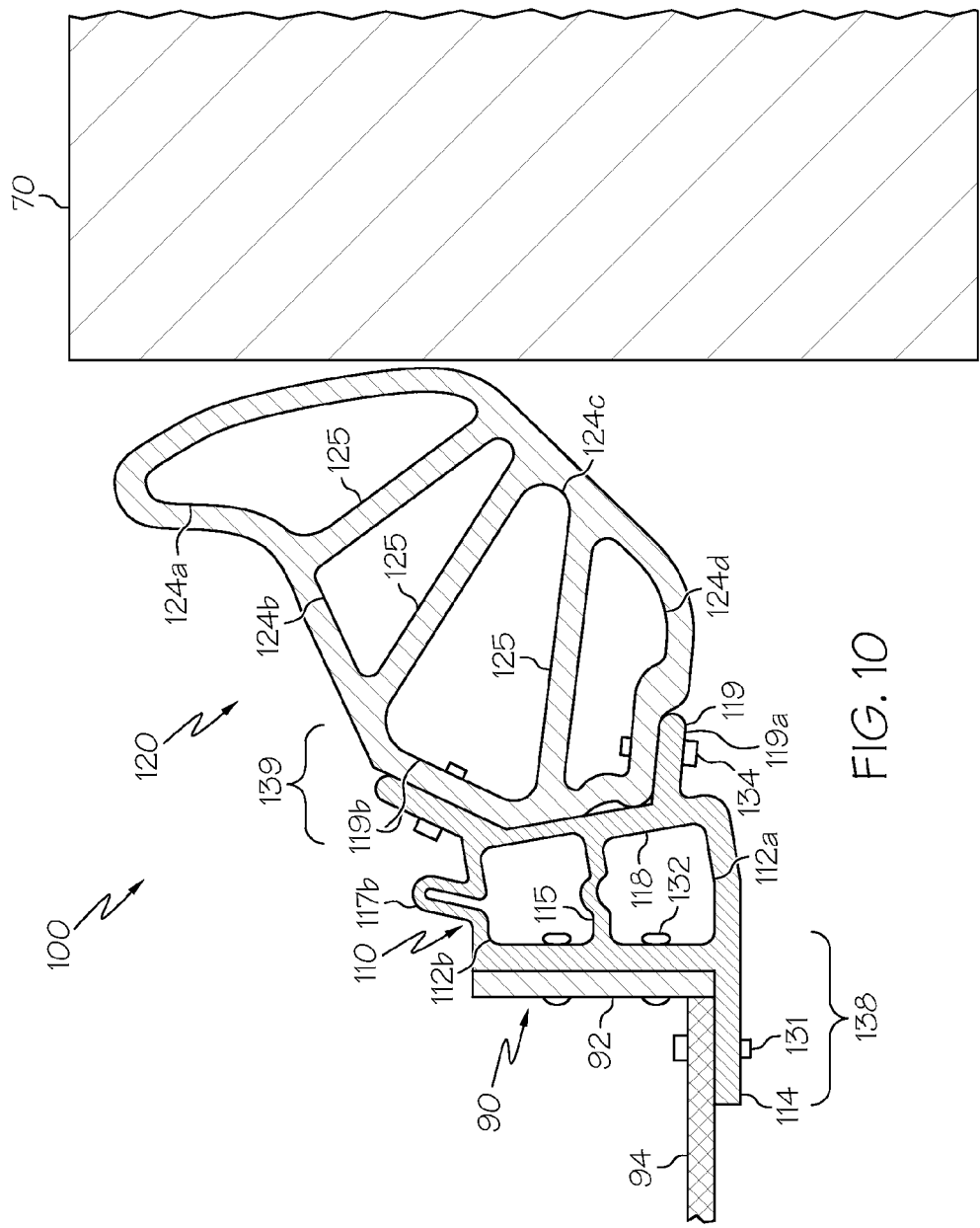
FIG. 10 schematically depicts a front sectional view of an impact protection structure for a vehicle shown along line A-A of FIG. 1 according to one or more embodiments shown and described herein.

Another embodiment of the impact protection structure 100 depicted in an undeformed state in FIG. 3 is depicted undergoing an impact event with a blunt-object barrier 70 in FIGS. 6 and 10. Referring now to FIG. 6, because the first exterior lumen 124a has a buckling load limit less than the second, third, or fourth exterior lumens 124b, 124c, 124d, as well as the interior rail 110, the initial application of force applied by the blunt-object barrier 70 initially deforms the first exterior lumen 124b. Thus, the first exterior lumen 124a deforms, while the second, third, and fourth interior lumens 124b, 124c, 124d and the interior rail 110 remain largely or wholly undeformed (i.e., as shown in the undeformed state in FIG. 3).

Referring now to FIG. 10, after being deformed by the blunt-object barrier 70, the first exterior lumen 124a continues to dissipate energy associated with the impact by the blunt-object barrier 70. However, the now-deformed shape of the first exterior lumen 124a reduces the amount of energy that the first exterior lumen 124a can continue to dissipate. The first exterior lumen 124a continues to deform until such time that the force applied by the blunt-object barrier 70 exceeds the buckling load limit of the interior rail 110. In this embodiment, once the buckling load limit of one of the first or second interior lumens 112a, 112b has been exceeded, the first or second interior lumen 112a, 112b collapses onto itself, while the second, third, and fourth exterior lumen 124b, 124c, 124d remain largely or wholly undeformed (i.e., as shown in the undeformed state in FIG. 3). Thus, the buckling load limit of the first exterior lumen 124a is less than the interior rail 110 such that when the exterior rail is impacted by a blunt-object barrier, at least a portion of the exterior rail 120 buckles before the interior rail 110. In addition, the buckling load limit of the second, third, and fourth exterior lumens 124b, 124c, 124d are greater than the interior rail 110, thereby inducing the second interior lumen 112b to buckle before the second, third, or fourth exterior lumen 124b, 124c, 124d.

Figure 11:
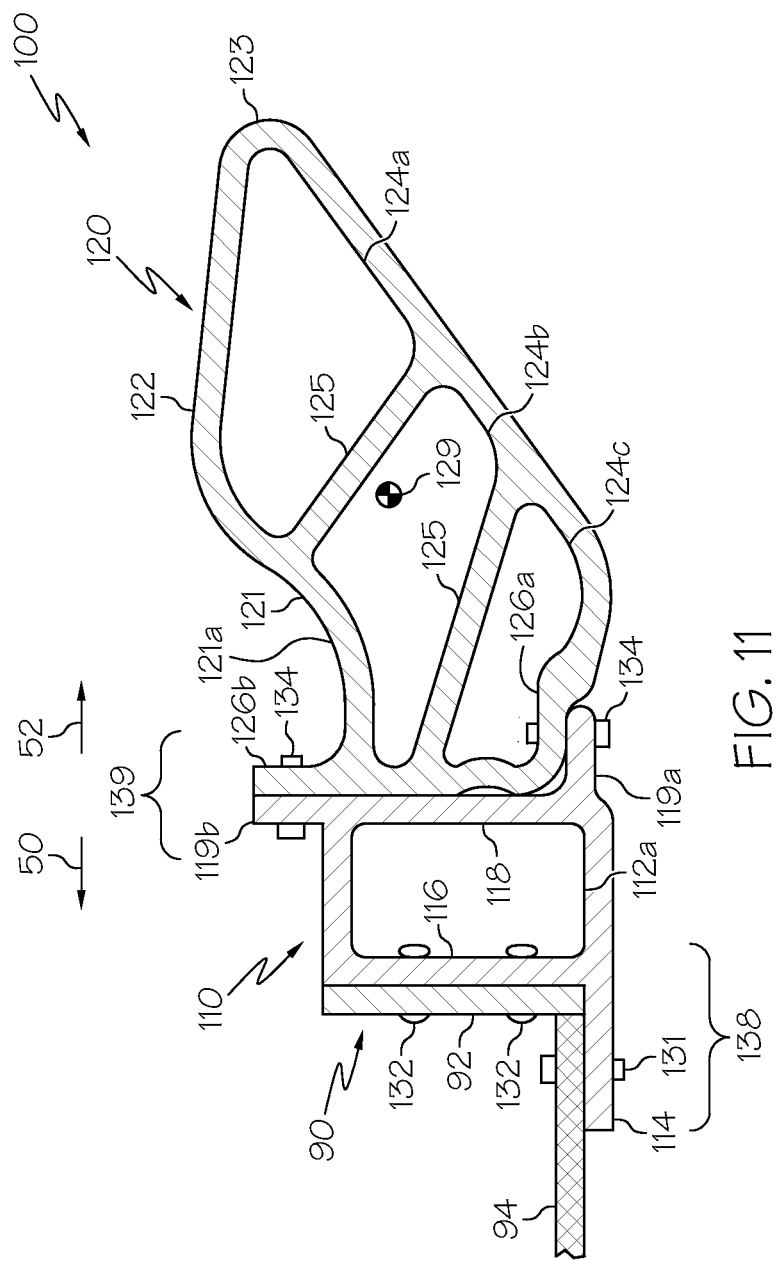
FIG. 11 schematically depicts a front sectional view of an impact protection structure for a vehicle shown along line A-A of FIG. 1 according to one or more embodiments shown and described herein.
Figure 12:
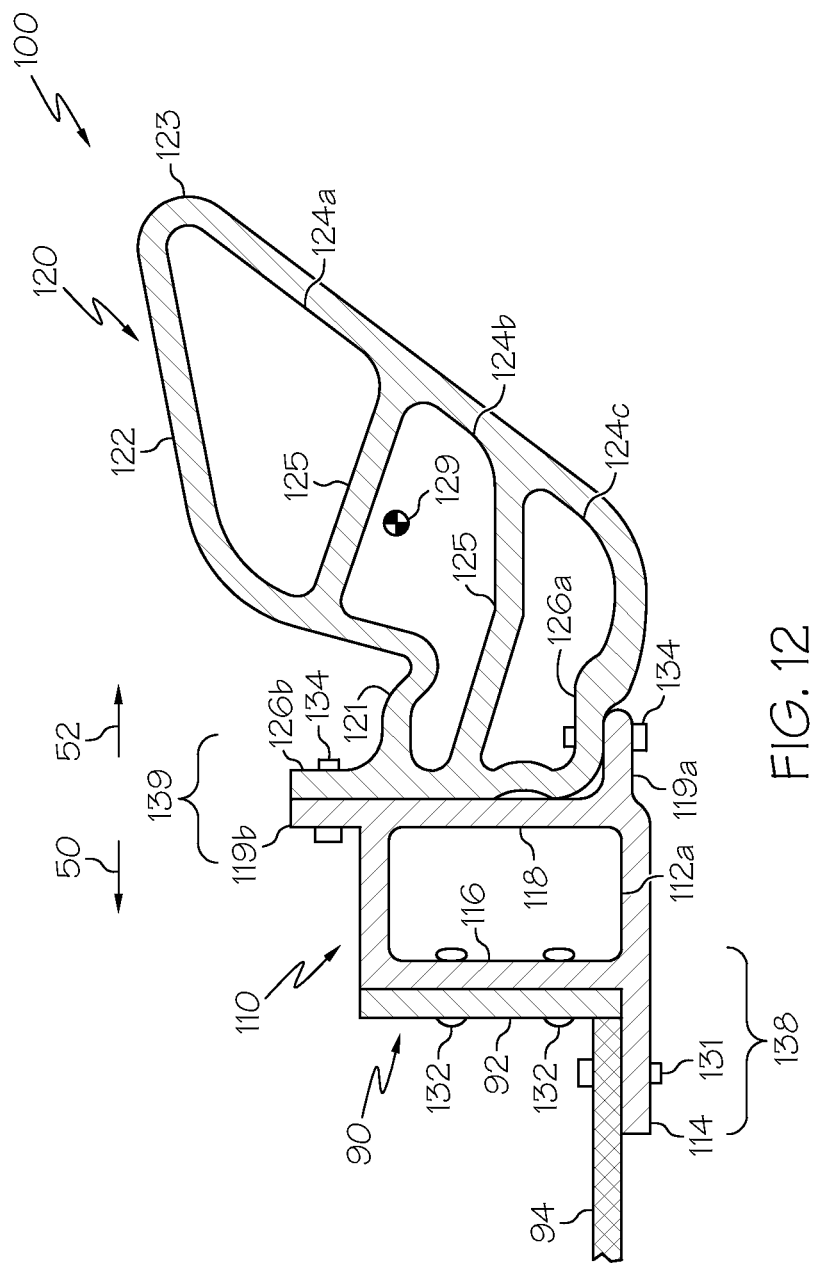
FIG. 12 schematically depicts a front sectional view of an impact protection structure for a vehicle shown in FIG. 11 undergoing a collision impact event.

Referring now to FIGS. 11 and 12, another embodiment of the impact protection structure 100 is depicted. In this embodiment, an inboard rocker surface 121 of the exterior rail 120 includes a concave portion 121a that is positioned such that the concavity is in the direction of the adjacent septa 125 separating the second exterior lumen 124b from the first and third exterior lumen 124a, 124c. In this embodiment, the inboard rocker surface 121 is more prone to buckling than the outboard rocker surface 122. Further, the inboard rocker surface 121 is more prone to buckling than the interior rail 110. Accordingly, it should be understood that the exterior buckling load limit of the exterior rail 120 is less than the interior-buckling load limit of the interior rail 110, such that the exterior rail 120 preferentially buckles before the interior rail 110 in the event of a blunt-object impact with the impact protection structure 100. When a load is applied to the exterior rail 120 at the contact surface 123, the second exterior lumen 124b will tend to collapse due to the buckling of the concave portion 121a of the inboard rocker surface 121, as depicted in FIG. 12. Thus, the concave portion 121a of the inboard rocker surface 121 creates a preferential buckling shape that tends to collapse adjacent septa 125 towards one another when the exterior rail 120 is impacted by a blunt-object barrier 70.

Figure 13:
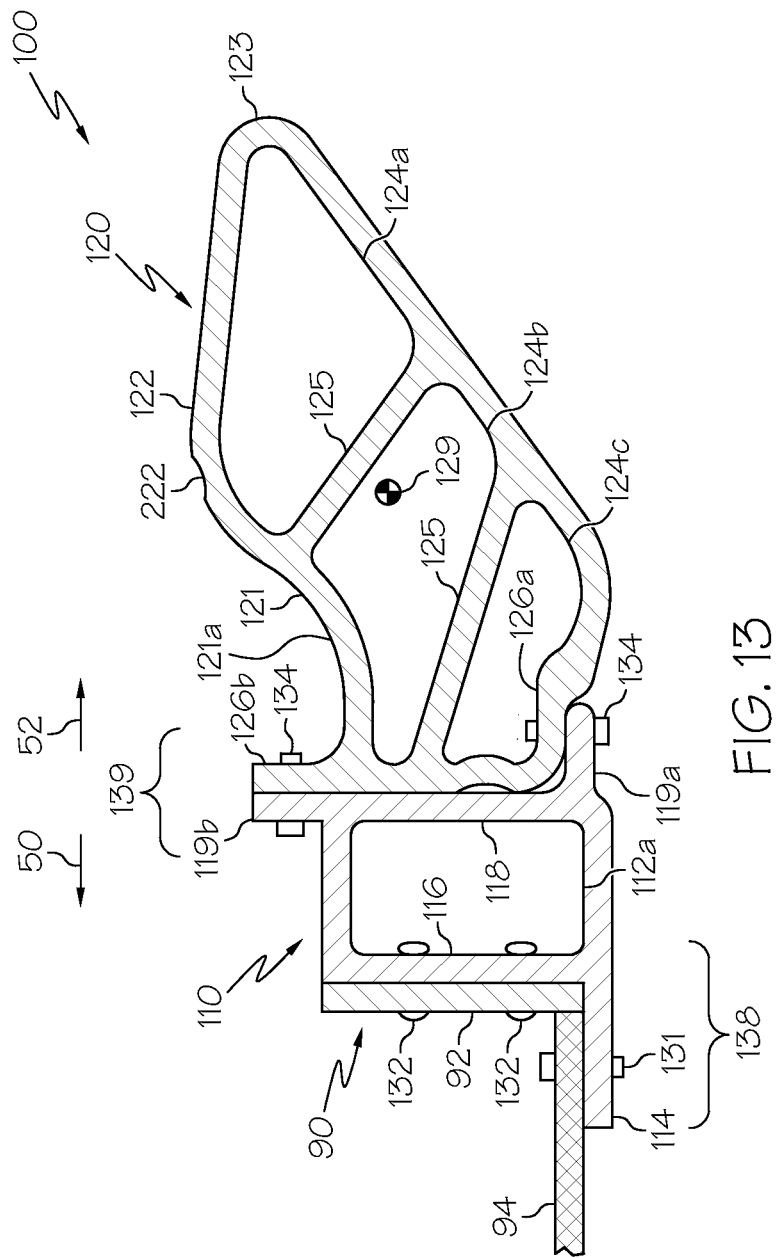
FIG. 13 schematically depicts a front sectional view of an impact protection structure for a vehicle shown along line A-A of FIG. 1 according to one or more embodiments shown and described herein.

Referring now to FIG. 13, another embodiment of the impact protection structure 100 is depicted. In this embodiment, the inboard rocker surface 121 of the exterior rail 120 includes a concave portion 121a that is positioned in the direction of the adjacent septa 125 separating the second exterior lumen 124b from the first and third exterior lumen

124*a*, 124*c*. The exterior rail 120 also includes an attenuation channel 222 that extends along the length of the exterior rail 120 and is positioned on one of or between the inboard rocker surface 121 and the outboard rocker surface 122. The attenuation channel 222 has a reduced cross-sectional thickness as compared to other faces of the exterior rail 120. The reduced cross-sectional thickness of the attenuation channel 222 reduces the amount of force that is resisted by the exterior rail 120 before the exterior rail 120 causes the attenuation channel 222 to overload and separate, as depicted in FIG. 14.

Figure 14:
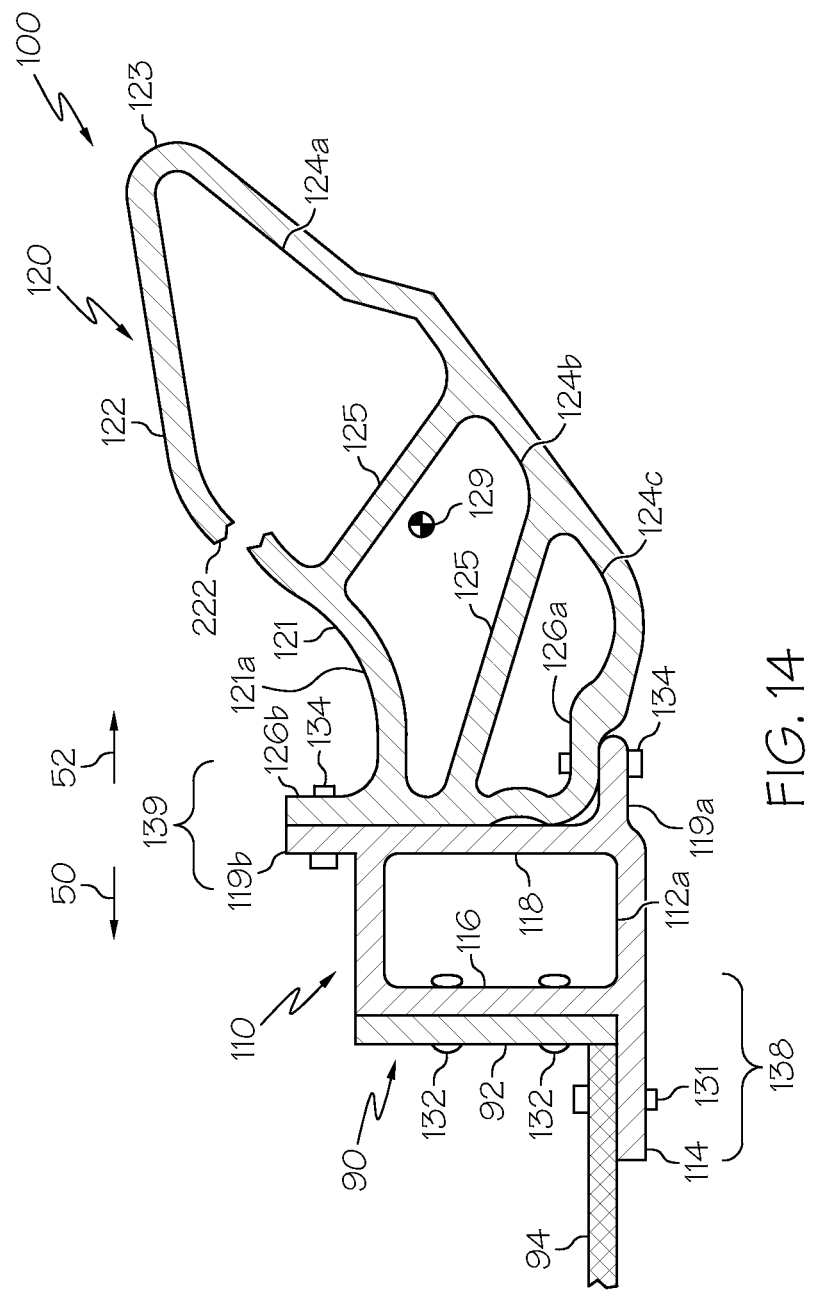
FIG. 14 schematically depicts a front sectional view of an impact protection structure for a vehicle show in FIG. 13 undergoing a collision impact event.

Still referring to FIG. 14, by controlling the location of separation of the exterior rail 120 (i.e., at locations along the attenuation channel 222), the first exterior lumen 124*a* tends to buckle onto itself, thereby encouraging progressive collapse of the second and third exterior lumens 124*b*, 124*c*. Separation of the exterior rail 120 at locations along the attenuation channel 222 may provide additional impact protection margin that protects the battery support tray 90.

Figure 15:
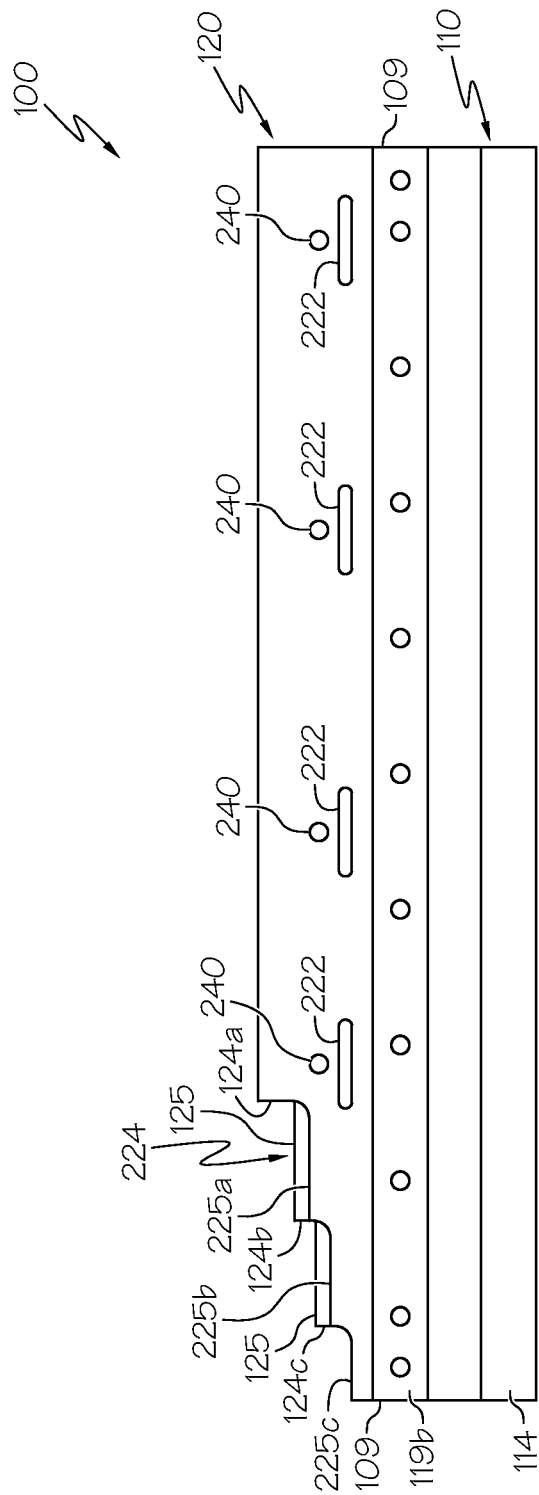
FIG. 15 schematically depicts a top view of an impact protection structure for a vehicle according to one or more embodiments shown or described herein.

In some embodiments, the attenuation channel 222 extends along the entire length of the exterior rail 120. Referring now to FIG. 15, the attenuation channel 222 may also be intermittently positioned along the length of the exterior rail 120. In the embodiment depicted in FIG. 15, the portions of the attenuation channel 222 are positioned along the outboard rocker surface 122 at positions corresponding to attachment locations 240. In general, fasteners are passed through the attachment locations 240 to secure the exterior rail 120 to the vehicle 60. This increase in structural rigidity of the exterior rail 120 may tend to shift the location of fracture of the exterior rail 120, in the event of an impact with a blunt-object barrier 70. The attenuation channels 222 reduce the strength of the exterior rail 120 at local positions along the length of the exterior rail 120, thereby encouraging local separation of the exterior rail 120 at discrete locations corresponding to the positions of the attachment locations 240.

In any of the embodiments of the impact protection structure 100 depicted in FIGS. 3 and 6 to 11, by creating a preferential buckling shape in one of the interior rail 110 or the exterior rail 120, the moment load that may be imparted to the mechanical fasteners 131 coupling the interior rail 110 to the tray floor 94 and the mechanical fasteners 132 coupling the interior rail 110 to the end plates 92 may be managed. Limiting the moment load applied to the mechanical fasteners 131, 132 may decrease the likelihood of breach of the structural integrity of the battery support tray 90, and therefore decrease the likelihood of damage to the battery packs 80 (see FIG. 2).

Referring again to FIG. 15, the exterior rail 120 may include a plurality of relief zones 224 that pass though at least one of the first, second, and third exterior lumens 124*a*, 124*b*, 124*c*. As depicted in FIG. 15, the relief zones 224 may be positioned proximate to the ends 109 of the interior and exterior rails 110, 120. Such relief zones 224 may be incorporated into the exterior rail 120 to accommodate various vehicle components including, for example, vehicle suspension components such as suspension links that extend laterally from the unibody 64 to the wheels of the vehicle 60 (not shown). As to provide the suspension links with clearance to be installed and to move through their range of motion, portions of the exterior rail 120 may be removed, forming the relief zones 224. In the embodiment depicted in FIG. 14, the relief zone 224 is formed by a plurality of intermediate openings 225*a*, 225*b*, 225*c* that extend through a portion of the exterior rail 120. Each of the intermediate openings 225*a*, 225*b*, 225*c* extends into a deeper portion of the exterior rail 120. For example, the first intermediate opening 225*a* extends through at least the outboard rocker surface 122 into the first exterior lumen 124*a*, exposing the septum 125 separating the second exterior lumen 124*b* from the first exterior lumen 124*a*. The second intermediate opening 225*b* extends through the inboard rocker surface 121 and the septum 125 separating the third exterior lumen 124*c* from the second exterior lumen 124*b*. The third intermediate opening 225*c* extends through the through exterior lumen 124*c*. The first, second, and third intermediate openings 225*a*, 225*b*, 225*c* of the relief zone 224 are arranged such that the intermediate openings 225*a*, 225*b*, 225*c* form a "stair-step" like shape, wherein the first, second, and third intermediate openings 225*a*, 225*b*, 225*c* expose progressively deeper sections of the exterior rail 120.

While the relief zones 224 reduce the local energy dissipation capabilities of the exterior rail 120 at positions proximate to the relief zones 224, surrounding components of the vehicle 60 may dissipate an increased portion of energy due to an impact event with a blunt object. Further, because the relief zones 224 are positioned proximate to the ends 109 of the interior and exterior rails 110, 120 and away from the center of gravity of the vehicle 60, impact with a blunt object at these positions may tend to rotate the vehicle 60 around the blunt object. Because a proportion of the energy due to impact with a blunt object is transferred to rotate the vehicle 60, the amount of energy to be dissipated by deformation of the exterior rail 120 is also reduced. Thus, the likelihood of damage to the battery packs 80 continues to be mitigated by the vehicle and its components in spite of the reduction in energy dissipation capability of the exterior rail 120 at positions proximate to the relief zones 224. Further, the relief zones 224 may reduce the mass of the exterior rail 120 at positions where energy dissipation requirements of the exterior rail 120 are reduced.

Figure 16:
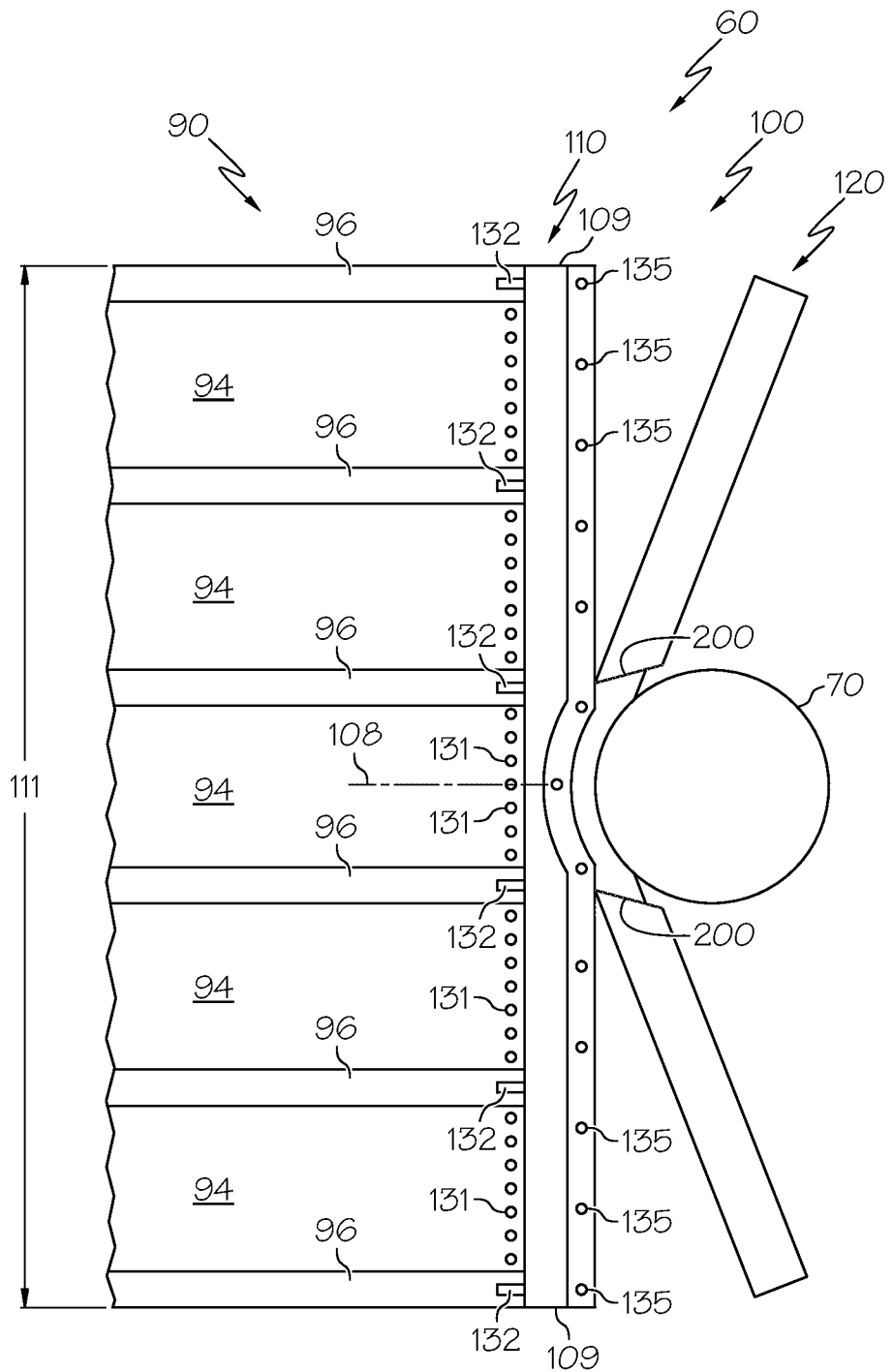
FIG. 16 schematically depicts a top view of the impact protection structure for a vehicle shown undergoing a collision impact event according to one or more embodiments shown or described herein.

Referring now to FIGS. 1 and 16, when the vehicle 60 is impacted with a blunt-object barrier 70, the blunt-object barrier 70 may contact the impact protection structure 100 at a local region along the interior rail length 111. Because of the local application of force, the impact protection structure 100 may exhibit different loading conditions along the length of the impact protection structure 100. In the embodiment depicted in FIG. 16, the blunt-object barrier 70 applies a load to the impact protection structure 100 at approximately the center 108 of the interior rail length 111 between adjacent cross-support members 96. As the blunt-object barrier applies a load to the exterior rail 120 of the impact protection structure 100, the exterior rail 120 tends to plastically and elastically deform around the blunt-object barrier 70, such that the exterior rail 120 fractures and deforms according to the contours of the blunt-object barrier 70. During an impact event, the blunt-object barrier 70 will apply a load that induces a compressive stress into the exterior rail 120 in regions local to the blunt-object barrier 70 (i.e., near the center 108 of the interior rail 110). At regions of the exterior rail 120 remote from the blunt-object barrier 70 (i.e., near the ends 109 of the interior rail 110), the blunt-object barrier 70 will not directly apply a compressive load. However, because the impact protection structure 100 is continuous along the interior rail length 111, the exterior rail 120 will tend to deform around the blunt-object barrier 70, placing a tensile load and/or a moment load on the exterior rail 120 at regions remote from the blunt-object barrier 70 (i.e. at regions away from the point of impact), such as at positions proximate to the ends 109 of the interior rail 110. This tensile load and/or moment load tends to separate the exterior rail 120 from the interior rail 110.

As discussed above, the exterior connection strength between the interior rail 110 and the exterior rail 120 may be less than the interior connection strength between the battery support tray 90 and the interior rail 110. Because of this, the exterior connection 139 between the interior rail 110 and the exterior rail 120 will be more prone to separation than the interior connection 138 between the battery support tray 90 and the interior rail 110. Thus, as the exterior rail 120 deforms around the blunt-object barrier 70 and the exterior rail 120 places a tensile load on both the interior and exterior connections 138, 139, the exterior connection 139 is more likely to fail than the interior connection 138. By controlling the relative strength of the interior connection 138 and the exterior connection 139 (i.e., by varying the number, size, type, and strength of the mechanical fasteners 134, as well as the pattern of securement positions 135 as depicted in FIGS. 4 and 5, along with the thicknesses of the lower and upper interior mounting regions 119a, 119b of the interior rail 110 and the lower and upper exterior mounting regions 126a, 126b of the exterior rail 120 as shown, for example, in FIG. 13) the exterior rail 120 can be preferentially separated from the interior rail 110 when a resulting tensile load is applied to the exterior rail 120. By preferentially separating the interior rail 110 from the exterior rail 120 (i.e., by at least partially separating the exterior connection 139), additional energy associated with the blunt-object barrier 70 impacting the impact protection structure 100 can be dissipated by over-loading the mechanical fasteners 134. In addition, the energy of the blunt-object barrier 70 impacting the impact protection structure 100 can be directed into further fracturing, elastically deforming, and/or plastically deforming the exterior rail 120, and directed away from deforming the battery support tray 90. Thus, during an impact event, the impact protection structure 100 reduces application of forces applied by the interior rail 110 to the battery support tray 90 at positions proximate to the ends 109 of the interior rail 110, thereby mitigating or preventing damage to the battery support tray 90.

Still referring to FIG. 16, during high speed impacts, the deformation caused by the blunt-object barrier 70 may tend to induce cracks 200 into the high-deformation areas of the impact protection structure 100. With a sufficient impulse load applied to the impact protection structure 100, the cracks 200 will tend to grow through the thickness of the material. However, as discussed above, the exterior rail 120 is "detached" from the interior rail 110 at interstitial positions between the securement positions 135. Thus, when the impact protection structure 100 is impacted by a blunt-object barrier 70 at high speed and cracks 200 develop in the exterior rail 120, the crack growth terminates as the crack 200 grows through the thickness of the exterior rail 120. Additionally, as discussed above in regard to the inboard boundary wall 128 of the exterior rail 120 having a planar portion 127a and a contoured portion 127b (as depicted in FIG. 3), by spacing apart the exterior rail 120 from the interior rail 110, the impact protection structure 100 includes a discontinuous region that prevents propagation of cracks 200 from the exterior rail 120 to the interior rail 110. The crack 200 does not continue to grow through the interior rail 110, because the interior rail 110 and the exterior rail 120 are non-continuously attached to one another, creating an interruption in the crack growth path. Thus, the detached regions between the interior rail 110 and the exterior rail 120 and the spaced apart region between the interior rail 110 and the exterior rail 120 prevent the crack 200 from continuing to propagate from the exterior rail 120 to the interior rail 110. The spacing between the interior rail 110 and the exterior rail 120 damps the impulse load caused by the blunt-object impact, which greatly reduces energy available to induce a crack growing into the interior rail 110.

A number of inventive concepts of impact protection structures 100 have been disclosed to mitigate damage to underlying vehicle structures (including battery support trays 90). Such concepts include localized securement of the interior rail and the exterior rail, reduced exterior connection strength as compared with the interior connection strength, preferential buckling of one of the interior rail or the exterior rail, and spacing apart the interior rail and the exterior rail to prevent crack growth. The strength of the interior rail and/or the exterior rail may be modified locally based on the energy required to be dissipated during an impact event and distance from the center of gravity of the vehicle. It should be understood that each of these inventive concepts may be separately utilized in the impact protection structures disclosed herein. In addition, it should also be understood that any one of these inventive concepts may be utilized in an impact protection structure in conjunction with one or more of the other inventive concepts. For example and without limitation, preferential buckling of one of the interior rail or the exterior rail may be utilized in conjunction with a spaced apart interior and exterior rail.

It should now be understood that the impact protection structures described herein with an interior rail and an exterior rail may be utilized to prevent damage to a vehicle and its components, including a battery support tray. The exterior rail may include a plurality of exterior lumens that progressively collapse when impacted by a blunt-object barrier to prevent the blunt-object barrier from intruding through the impact protection structure. The exterior rail may also include features that encourage preferential buckling of the exterior rail to manage a bending moment that is induced to the connection between the vehicle and the impact protection structure. The connection strength between the impact protection structure and the vehicle may be stronger than the connection strength between the interior rail and the exterior rail to dissipate energy from an impact away from the vehicle. Further, by detaching the interior rail from the exterior rail, crack propagation through the impact protection structure may be limited. While specific mention has been made to the use of impact protection structures with electric or hybrid-electric vehicles, it should be understood that impact protection structures according to the present disclosure may be used in conjunction with conventional, gasoline or diesel-fueled vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An impact protection structure for a vehicle impacting a blunt-object barrier, the impact protection structure comprising:
   a support structure of the vehicle;
   an interior rail coupled to the support structure, wherein the interior rail comprises a predetermined interior buckling load limit; and
   an exterior rail coupled to the interior rail, wherein the exterior rail comprises a predetermined exterior buckling load limit, and the predetermined exterior buckling load limit is greater than the predetermined interior buckling load limit of the interior rail such that when the exterior rail is impacted by a blunt-object barrier, at least a portion of the interior rail buckles before the exterior rail.

2. The impact protection structure of claim 1, wherein the interior rail comprises an inboard wall positioned proximate to the support structure, an outboard wall positioned distally from the support structure, and an intermediate wall connecting the inboard wall and the outboard wall, wherein at least one of the outboard wall, the inboard wall, or the intermediate wall comprise a thinned wall, such that a wall thickness of the at least one of the outboard wall, the inboard wall, or the intermediate wall is thinner than a wall thickness of the others of the outboard wall, the inboard wall, and the intermediate walls.

3. The impact protection structure of claim 1, wherein the exterior rail further comprises an inboard boundary wall positioned between an upper exterior mounting region and a lower exterior mounting region, and at least a portion of the inboard boundary wall is spaced apart from an outboard wall of the interior rail.

4. The impact protection structure of claim 3, wherein the interior rail further comprises an upper interior mounting region and a lower interior mounting region, and the upper exterior mounting region and the lower exterior mounting region of the exterior rail are coupled to the upper and the lower interior mounting regions of the interior rail at a plurality of securement positions along a length of the interior rail.

5. The impact protection structure of claim 4, wherein the upper interior mounting region of the interior rail is detached from the upper exterior mounting region of the exterior rail at a plurality of interstitial positions between the plurality of securement positions.

6. The impact protection structure of claim 5, wherein the coupling of the interior rail and the support structure forms an interior connection along the length of the interior rail, the coupling of the exterior rail and the interior rail forms an exterior connection along the length of the interior rail, and a strength of the interior connection is greater than a strength of the exterior connection.

7. The impact protection structure of claim 1, wherein the exterior rail comprises a plurality of exterior lumens.

8. An impact protection structure for a vehicle impacting a blunt-object barrier, the impact protection structure comprising:
   a support structure of the vehicle;
   an interior rail coupled to the support structure, wherein the interior rail comprises a predetermined interior buckling load limit; and
   an exterior rail coupled to the interior rail, the exterior rail comprising a relief zone that passes through at least a portion of the exterior rail, and the exterior rail further comprising a predetermined exterior buckling load limit, wherein the predetermined exterior buckling load limit is greater than the predetermined interior buckling load limit of the interior rail such that when the exterior rail is impacted by a blunt-object barrier, at least a portion of the interior rail buckles before the exterior rail.

9. The impact protection structure of claim 8, wherein the interior rail comprises an inboard wall positioned proximate to the support structure, an outboard wall positioned distally from the support structure, and an intermediate wall connecting the inboard wall and the outboard wall, wherein at least one of the outboard wall, the inboard wall, or the intermediate wall comprise a thinned wall, such that a wall thickness of the at least one of the outboard wall, the inboard wall, or the intermediate wall is thinner than a wall thickness of the others of the outboard wall, the inboard wall, and the intermediate wall.

10. The impact protection structure of claim 8, wherein the exterior rail further comprises an inboard boundary wall positioned between an upper exterior mounting region and a lower exterior mounting region, and at least a portion of the inboard boundary wall is spaced apart from an outboard wall of the interior rail.

11. The impact protection structure of claim 10, wherein the interior rail further comprises an upper interior mounting region and a lower interior mounting region, and the upper exterior mounting region and the lower exterior mounting region of the exterior rail are coupled to the upper and the lower interior mounting regions of the interior rail at a plurality of securement positions along a length of the interior rail.

12. The impact protection structure of claim 11, wherein the upper interior mounting region of the interior rail is detached from the upper exterior mounting region of the exterior rail at a plurality of interstitial positions between the plurality of securement positions.

13. The impact protection structure of claim 12, wherein the coupling of the interior rail and the support structure forms an interior connection along the length of the interior rail, the coupling of the exterior rail and the interior rail forms an exterior connection along the length of the interior rail, and a strength of the interior connection is greater than a strength of the exterior connection.

14. The impact protection structure of claim 8, wherein the exterior rail comprises a plurality of exterior lumens that are each separated from one another by a septum.

15. The impact protection structure of claim 14, wherein the relief zone exposes the septum positioned between two adjacent exterior lumens along a portion of a length of the exterior rail.

16. An impact protection structure for a vehicle impacting a blunt-object barrier, the impact protection structure comprising:
   a support structure of the vehicle;
   an interior rail coupled to the support structure, wherein the interior rail comprises a predetermined interior buckling load limit; and
   an exterior rail coupled to the interior rail, the exterior rail comprising a plurality of exterior lumens, wherein each of the exterior lumens comprise a predetermined buckling load, and at least one of the exterior lumens has a buckling load limit greater than the predetermined interior buckling load limit of the interior rail such that when the exterior rail is impacted by a blunt-object barrier, at least a portion of the interior rail buckles before the at least one of the exterior lumens.

17. The impact protection structure of claim 16, wherein the exterior rail further comprises an inboard boundary wall positioned between an upper exterior mounting region and a lower exterior mounting region, and at least a portion of the inboard boundary wall is spaced apart from an outboard wall of the interior rail.

18. The impact protection structure of claim 17, wherein the interior rail further comprises an upper interior mounting region and a lower interior mounting region, and the upper exterior mounting region and the lower exterior mounting region of the exterior rail are coupled to the upper and the lower interior mounting regions of the interior rail at a plurality of securement positions along a length of the interior rail.

19. The impact protection structure of claim 18, wherein the upper interior mounting region of the interior rail is detached from the upper exterior mounting region of the exterior rail at a plurality of interstitial positions between the plurality of securement positions.

20. The impact protection structure of claim 19, wherein the coupling of the interior rail and the support structure forms an interior connection along the length of the interior rail, the coupling of the exterior rail and the interior rail forms an exterior connection along the length of the interior rail, and a strength of the interior connection is greater than a strength of the exterior connection.

* * * * *